(12) United States Patent
Take et al.

(10) Patent No.: US 8,896,941 B2
(45) Date of Patent: Nov. 25, 2014

(54) IMAGE CAPTURING LENS, OPTICAL APPARATUS HAVING SAME, AND METHOD FOR MANUFACTURING IMAGE-CAPTURING LENS

(75) Inventors: Toshinori Take, Yokohama (JP); Takayuki Sensui, Tokyo (JP)

(73) Assignee: Nikon Corporation, Tokyo (JP)

(*) Notice: Subject to any disclaimer, the term of this patent is extended or adjusted under 35 U.S.C. 154(b) by 67 days.

(21) Appl. No.: 13/119,716

(22) PCT Filed: Jul. 30, 2009

(86) PCT No.: PCT/JP2009/003606
§ 371 (c)(1),
(2), (4) Date: Mar. 17, 2011

(87) PCT Pub. No.: WO2010/032358
PCT Pub. Date: Mar. 25, 2010

(65) Prior Publication Data
US 2011/0169974 A1  Jul. 14, 2011

(30) Foreign Application Priority Data

Sep. 18, 2008 (JP) .................................. 2008-239014

(51) Int. Cl.
G02B 9/00 (2006.01)
G02B 9/60 (2006.01)
G02B 9/62 (2006.01)
G02B 27/64 (2006.01)
G02B 13/00 (2006.01)
G03B 43/00 (2006.01)

(52) U.S. Cl.
CPC .............. *G02B 27/646* (2013.01); *G02B 13/00* (2013.01); *G03B 43/00* (2013.01)
USPC ............................. 359/754; 359/756; 359/763

(58) Field of Classification Search
USPC ......... 359/754–757, 763–764, 771–772, 784, 359/793–794, 684
See application file for complete search history.

(56) References Cited

U.S. PATENT DOCUMENTS 5,706,141 A    1/1998  Abe
6,016,229 A *  1/2000  Suzuki ......................... 359/784
(Continued)

FOREIGN PATENT DOCUMENTS

CN    101063745 A    10/2007
EP    0 789 259 A2    8/1997
(Continued)

OTHER PUBLICATIONS

Office Action issued Aug. 21, 2012 in Chinese Patent Application No. 200980136794.1.

(Continued)

*Primary Examiner* — Jordan Schwartz
(74) *Attorney, Agent, or Firm* — Miles & Stockbridge P.C.

(57) ABSTRACT

An image-capturing lens has, in order from an object, an object side lens group G1 and an image side lens group G2 which is disposed next to the object side lens group G1 with an air space, and focusing is performed from a distant object to a close object by moving at least a part of the image side lens group G2 along an optical axis as a focusing lens group, and image stabilization is performed by moving at least a part of the image side lens group G2 as a shift lens group so as to have components roughly orthogonal to the optical axis.

15 Claims, 29 Drawing Sheets

(EXAMPLE 1)

(56) References Cited

U.S. PATENT DOCUMENTS

| | | | |
|---|---|---|---|
| 7,286,304 B1 | 10/2007 | Ohtake | |
| 7,417,801 B2 * | 8/2008 | Nakatani et al. | 359/687 |
| 7,663,816 B2 * | 2/2010 | Sato | 359/794 |
| 7,706,087 B2 * | 4/2010 | Obama | 359/794 |
| 2002/0005851 A1 | 1/2002 | Kinno et al. | |
| 2005/0219715 A1 | 10/2005 | Kimura et al. | |
| 2007/0223114 A1 | 9/2007 | Yamamoto | |
| 2007/0263299 A1 | 11/2007 | Ohtake | |
| 2009/0015938 A1 * | 1/2009 | Harada | 359/676 |
| 2009/0052051 A1 * | 2/2009 | Hayakawa et al. | 359/683 |
| 2009/0185293 A1 * | 7/2009 | Harada | 359/784 |
| 2009/0244724 A1 * | 10/2009 | Shibata | 359/792 |
| 2009/0257125 A1 * | 10/2009 | Take | 359/557 |

FOREIGN PATENT DOCUMENTS

| | | |
|---|---|---|
| EP | 0 789 259 A3 | 8/1997 |
| EP | 1 837 693 A1 | 9/2007 |
| EP | 1 850 164 A2 | 10/2007 |
| JP | 01-155310 A | 6/1989 |
| JP | 9-113800 A | 5/1997 |
| JP | 9-189856 A | 7/1997 |
| JP | 9-218348 A | 8/1997 |
| JP | 9-236742 A | 9/1997 |
| JP | 2000-258686 A | 9/2000 |
| JP | 2003-43348 A | 2/2003 |
| JP | 2004-226740 A | 8/2004 |
| JP | 2005-316398 A | 11/2005 |
| JP | 2007-286596 A | 11/2007 |
| JP | 2007-292994 A | 11/2007 |
| JP | 2008-151949 A | 7/2008 |
| JP | 2009-258159 A | 11/2009 |
| KR | 10-2007-0105249 A | 10/2007 |

OTHER PUBLICATIONS

Office Action and Search Report issued Jun. 26, 2013, in Chinese Patent Application No. 200980136794.1.

* cited by examiner

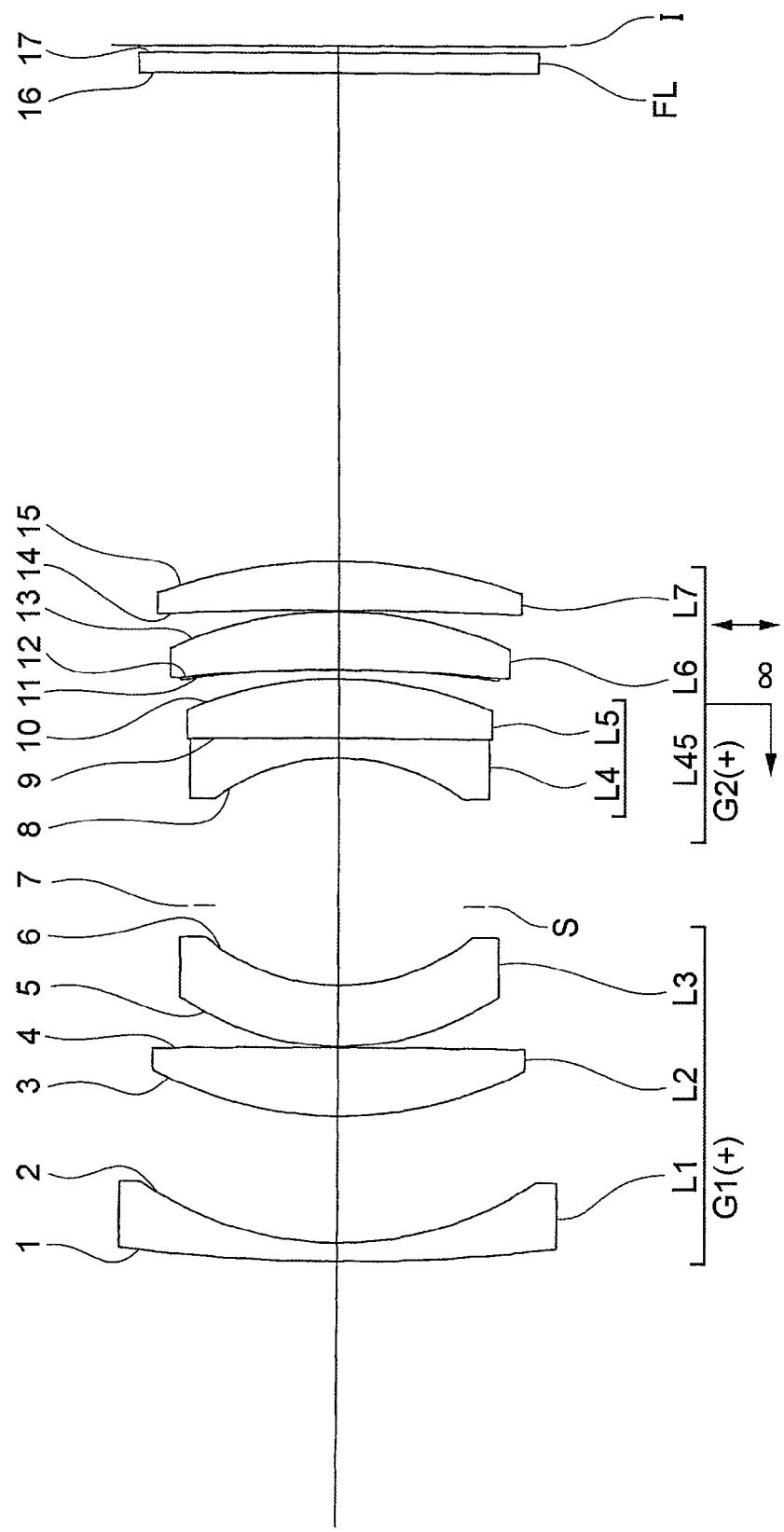

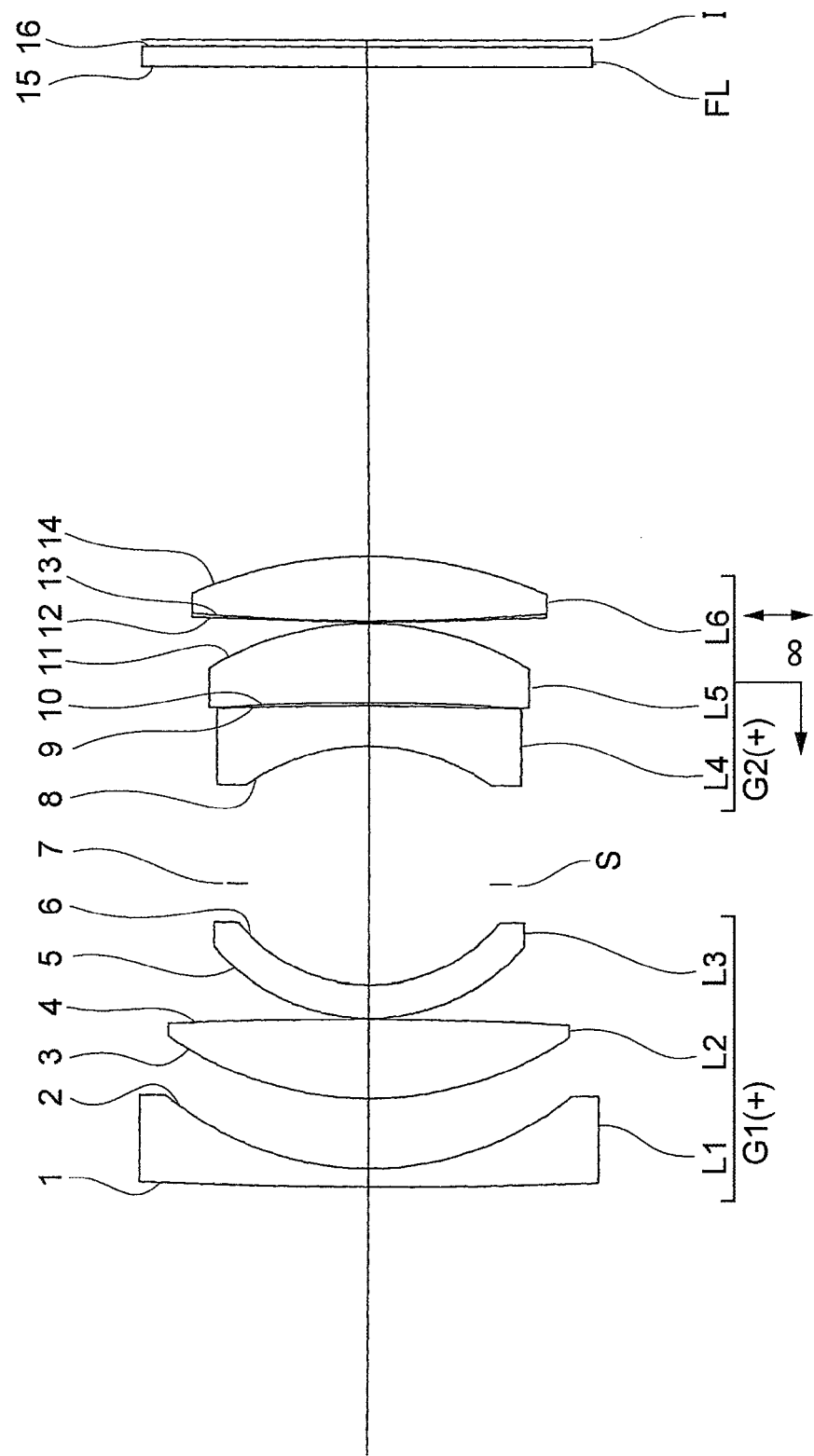
FIG. 4 (EXAMPLE 2)

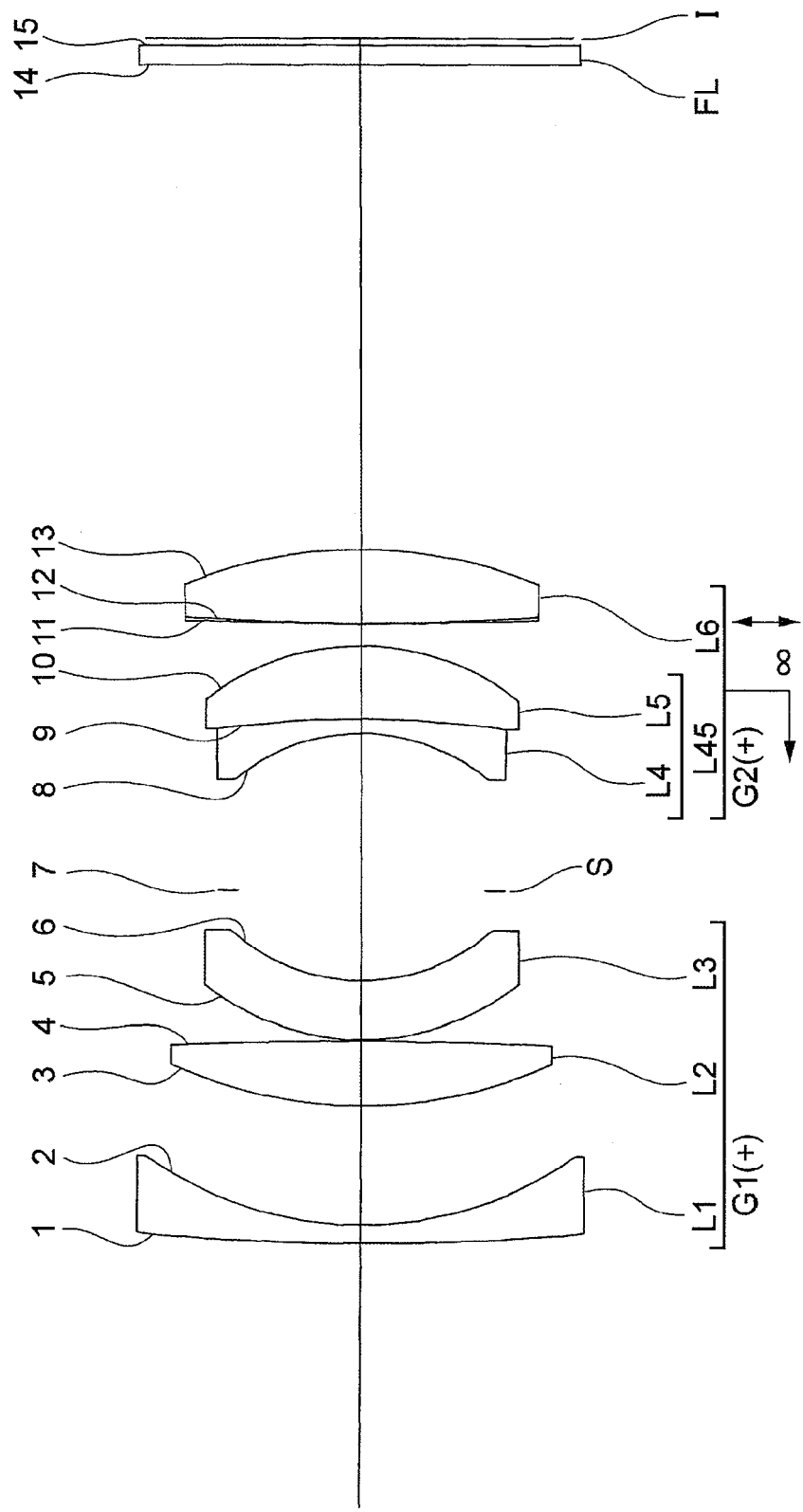
FIG.7 (EXAMPLE 3)

SPHERICAL ABERRATION    ASTIGMATISM    DISTORTION    COMA ABERRATION

LATERAL ABERRATION

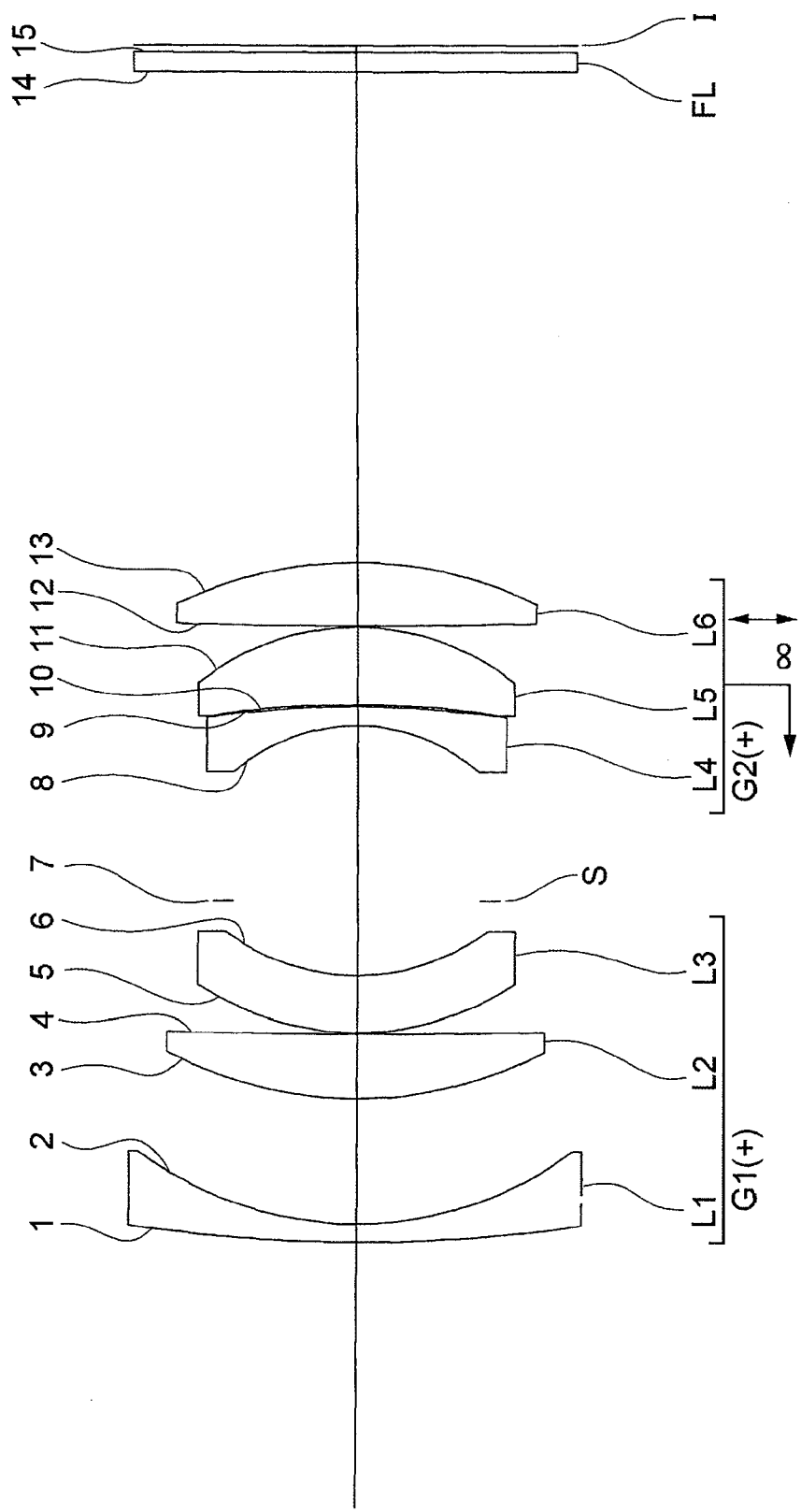

(EXAMPLE 5)

(EXAMPLE 6)

(EXAMPLE 7)

SPHERICAL ABERRATION  ASTIGMATISM  DISTORTION  COMA ABERRATION

LATERAL ABERRATION (EXAMPLE 8)

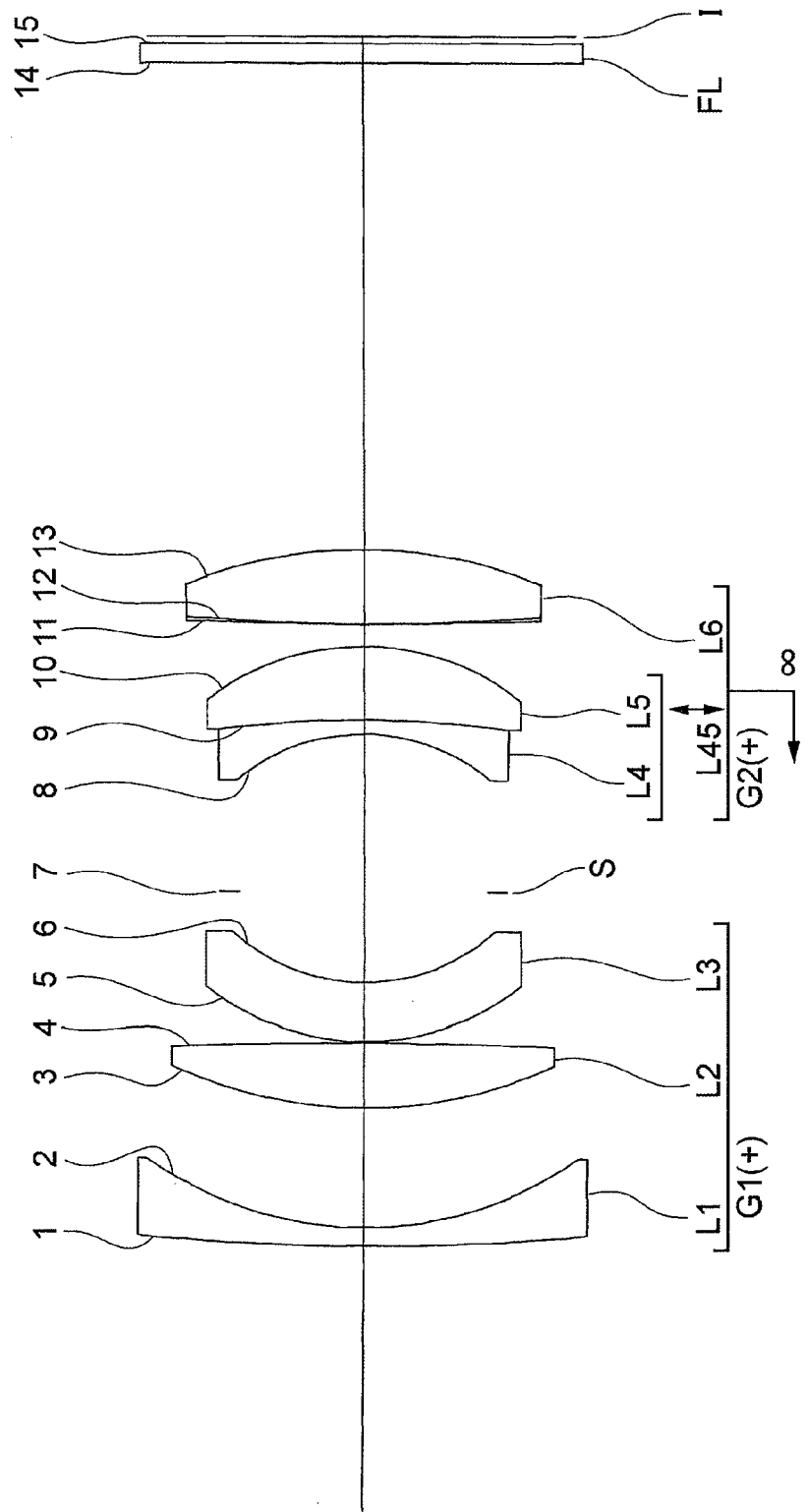

SPHERICAL ASTIGMATISM DISTORTION
ABERRATION

COMA
ABERRATION

LATERAL
ABERRATION

IMAGE CAPTURING LENS, OPTICAL APPARATUS HAVING SAME, AND METHOD FOR MANUFACTURING IMAGE-CAPTURING LENS

TECHNICAL FIELD

The present invention relates to an image-capturing lens, an optical apparatus having this image-capturing lens, and a method for manufacturing the image-capturing lens.

TECHNICAL BACKGROUND

As a large aperture standard lens used for a photograph camera and video camera, many Gauss lenses, in which refractive power is substantially symmetric with respect to an aperture stop provided between the lenses, have been proposed (e.g. see Patent Document 1).

Conventional lenses, however, are not sufficiently downsized, and when such a lens is used in a camera, it is difficult for a user to hold the camera, and image blur occurs and image quality drops during exposure, because of the subtle blur of the camera generated when capturing an image (e.g. blur of camera generated when the user presses a release button).

A known method to solve this problem is combining a detection system for detecting camera blur, a computing system for controlling the shift lens group according to a value which is output by the detection system, and a drive system for shifting the shift lens group as an optical system that can shift images in the image-capturing lens, and correcting the image blur by driving the shift lens group so as to compensate for image blur due to camera blur.

CITATION LIST

Patent Document

Patent Document 1: Japanese Laid-Open Patent Publication No. H1-155310

SUMMARY OF INVENTION

Problems to be Solved by the Invention

In the case of a conventional camera, however, when image blur is corrected, it is difficult to implement both correcting various aberrations suitably and suppressing the performance change upon shifting the lens.

With the foregoing in view, it is an object of the present invention to provide an image-capturing lens which can correct various aberrations suitably, can minimize the performance change upon shifting the lens, is compact, and has excellent optical performance throughout the entire screen, an optical apparatus having this image-capturing lens, and a method for manufacturing this image-capturing lens.

Means to Solve the Problems

To achieve this object, an image capturing lens of the present invention has, in order from an object, an object side lens group, and an image side lens group which is disposed next to the object side lens group with an air space, wherein focusing is performed from a distant object to a close object by moving at least a part of the image side lens group along an optical axis as a focusing lens group, and image stabilization is performed by moving at least a part of the image side lens group, as a shift lens group, so as to have components substantially orthogonal to the optical axis.

It is preferable that the image side lens group has positive refractive power.

It is preferable that at least a part of the focusing lens group is the shift lens group.

It is preferable that the following conditional expression $0.27 < \Sigma d2/f < 0.60$ is satisfied, where f denotes a focal length of the image capturing lens, and $\Sigma d2$ denotes a length on the optical axis from a lens surface closest to the object to a lens surface closest to the image in the image side lens group.

It is preferable that the following conditional expression $0.06 < |f2|/|f1| < 0.49$ is satisfied, where f1 denotes a focal length of the object side lens group, and f2 denotes a focal length of the image side lens group.

It is preferable that the following conditional expression $0.80 < f/|fs| < 1.10$ is satisfied, where f denotes a focal length of the image capturing lens, and fs denotes a focal length of the shift lens group.

It is preferable that the following conditional expression $0.0 < (r2F + r1R)/(r2F - r1R) < 24.8$ is satisfied, where r1R denotes a radius of curvature of an image side surface of a lens closest to the object in the object side lens group, and r2F denotes a radius of curvature of an object side surface of a lens disposed at the image side of the lens closest to the object.

It is preferable that the following conditional expression $1.5 < TL/\Sigma d < 2.3$ is satisfied, where TL denotes a total length of the image capturing lens, and $\Sigma d$ denotes a length, on the optical axis, from a lens surface closest to the object in the object side lens group to a lens surface closest to the image in the image side lens group.

It is preferable that the object side lens group has positive refractive power.

It is preferable that the focusing lens group is the shift lens group.

It is preferable that the focal length of the image capturing lens is fixed.

It is preferable that the image side lens group has a positive lens component, and the positive lens component includes at least one aspherical surface.

It is preferable that an aperture stop is disposed between the object side lens group and the image side lens group.

It is preferable that the image side lens group has a negative lens component disposed closest to the object, and a positive lens component disposed at the image side of the negative lens component.

It is preferable that the image side lens group has a cemented lens which has a negative lens component and a positive lens component, and has a positive or negative refractive power.

It is preferable that the image side lens group has a cemented lens of a negative meniscus lens having a concave surface facing the object, and a positive meniscus lens having a convex surface facing the image.

An optical apparatus of the present invention (digital single lens reflex camera 1 in the case of the present embodiment) has the above mentioned lens as the image-capturing lens for forming an image on a predetermined image plane.

A method for manufacturing an image-capturing lens of the present invention includes: disposing, in order from an object, an object side lens group and an image side lens group which is disposed next to the object side lens group with an air space; moving at least a part of the image side lens group in the optical axis direction, as a focusing lens group, upon focusing from a distant object to a close object; and moving at least a part of the image side lens group, as a shift lens group, so as to have components substantially orthogonal to the optical axis upon stabilizing an image.

Advantageous Effects of the Invention

According to this present invention, an image-capturing lens which can correct various aberrations well, can minimize the performance change upon shifting the lens, is compact, and has excellent optical performance throughout the entire screen, an optical apparatus having this image-capturing lens, and a method for manufacturing this image-capturing lens can be provided.

BRIEF DESCRIPTION OF THE DRAWINGS

FIG. 1 is a diagram depicting a configuration of an image-capturing lens according to Example 1, and a state of movement of each lens upon changing from a state of focusing on infinity to a state of focusing on close distance;

FIG. 4 is a diagram depicting a configuration of an image-capturing lens according to Example 2, and a state of movement of each lens upon changing from a state of focusing on infinity to a state of focusing on close distance;

FIG. 7 is a diagram depicting a configuration of an image-capturing lens according to Example 3, and a state of movement of each lens upon changing from a state of focusing on infinity to a state of focusing on close distance;

FIG. 10 is a diagram depicting a configuration of an image-capturing lens according to Example 4, and a state of movement of each lens upon changing from a state of focusing on infinity to a state of focusing on close distance;

FIG. 25 is a diagram depicting a configuration of an image-capturing lens according to Example 9, and a state of movement of each lens upon changing from a state of focusing on infinity to a state of focusing on close distance;

DESCRIPTION OF EMBODIMENTS

Figure 2A:
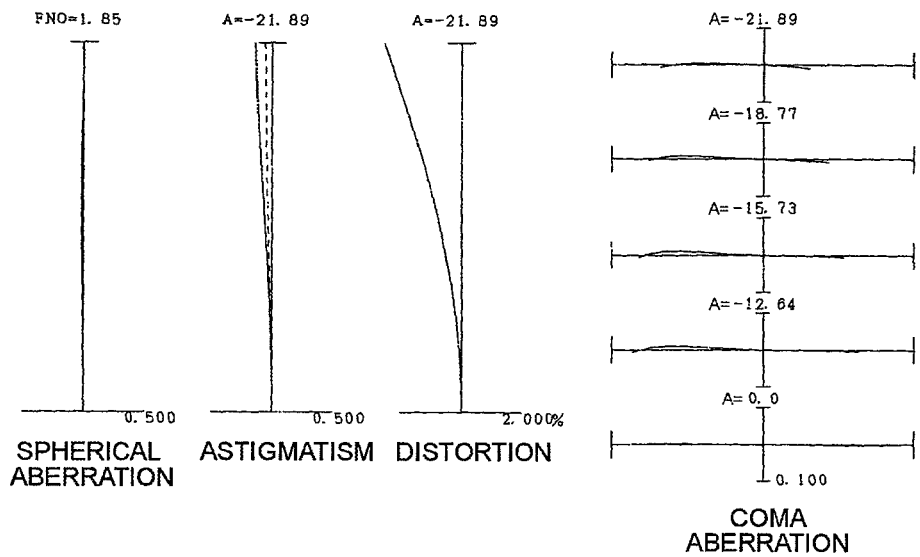
FIG. 2A are graphs showing various aberrations according to Example 1 upon focusing on infinity, and FIG. 2B are graphs showing lateral aberrations according to Example 1 in the lens shift state (0.2 mm)

Preferred embodiments of the invention will now be described with reference to the drawings. As FIG. 1 shows, an image-capturing lens according to the present embodiment has, in order from an object, an object side lens group G1 and an image side lens group G2 which is disposed next to the object side lens group G1 with an air space, and focusing is performed from a distant object to a close object by moving at least a part of the image side lens group G2 along an optical axis, and image stabilization is performed by moving at least a part of the image side lens group G2 so as to have components roughly orthogonal to the optical axis. By this configuration, fluctuation of curvature of field upon focusing on a close distance is decreased, and performance deterioration of coma aberration and curvature of field upon shifting the lens can be minimized. Therefore an image-capturing lens according to the present embodiment can be compact, and provide excellent optical performance throughout the entire screen.

To insure the effect of the present embodiment, it is preferable that the image side lens group G2 has a positive refractive power. Also to insure the effect of the present embodiment, it is preferable that at least a part of the focusing lens group is a shift lens group. In the case when a part of the focusing lens group is the shift lens group, it is particularly preferable that a partial lens group closest to the object in the focusing lens group is the shift lens group.

In the above configuration of the present embodiment, in order to reduce the size and improve performance, it is preferable that the following conditional Expression (1) is satisfied, where f denotes a focal length of the image-capturing lens and Σd2 denotes a length on the optical axis from a lens surface closest to the object (surface number 8 in FIG. 1) to a lens surface closest to the image (surface number 15 in FIG. 1) in the image side lens group G2.

$$0.27<\Sigma d2/f<0.60 \qquad (1)$$

Conditional Expression (1) appropriately specifies the total thickness Σd2 of the image side lens group G2 on the optical axis, so as to implement both insuring high image forming performance and lighter weight of the focusing lens group. If the conditions exceed the upper limit value of conditional Expression (1), the total thickness Σd2 of the image side lens group G2 on the optical axis is too thick. Then the lens portion of the image side lens group G2 and a lens barrel element to support this lens portion become too large and heavy, and the moving stroke of the focusing lens group is also restricted. In order to focus a close object using the focusing lens group with a small moving stroke, the refractive power of the image side lens group G2 must be increased, which makes it difficult to correct spherical aberration and coma aberration, and is therefore not desirable. If the conditions are below the lower limit value of conditional Expression (1), the total thickness Σd2 of the image side lens group G2 on the optical axis becomes too small. This has the advantage of reducing the size, but a number of lenses constituting the image side lens group G2 must be decreased, which makes it impossible to correct spherical aberration, coma aberration and curvature of field generated in the image-capturing lens, and is therefore not desirable.

To insure the effect of the present embodiment, it is preferable that the upper limit value of the conditional Expression (1) is 0.57. To further insure the effect of the present embodiment, it is preferable that the upper limit value of the conditional Expression (1) is 0.53.

To insure the effect of the present embodiment, it is preferable that the lower limit value of the conditional Expression (1) is 0.29. To further insure the effect of the present embodiment, it is preferable that the lower limit value of the conditional Expression (1) is 0.31. To further insure the effect of the present embodiment, it is preferable that the lower limit value of the conditional Expression (1) is 0.33.

It is preferable that the following conditional Expression (2) is satisfied, where f1 denotes a focal length of the object side lens group G1, and f2 denotes a focal length of the image side lens group G2.

$$0.06<|f2|/|f1|<0.49 \qquad (2)$$

The conditional Expression (2) specifies an appropriate range of the focal length ratio between the object side lens group G1 and the image side lens group G2. If the conditions exceed the upper limit value of the conditional Expression (2), the refractive power of the object side lens group G1 becomes relatively stronger (than the image side lens group G2), which makes it difficult to correct spherical aberration and coma aberration, which are generated in the object side lens group G1 alone. Furthermore, the refractive power of the image side lens group G2 becomes relatively weaker, which makes it difficult to correct the curvature of field well, and is therefore not desirable. If the conditions are below the lower limit value of the conditional Expression (2), on the other hand, the refractive power of the object side lens group G1 becomes relatively weaker (than the image side lens group G2), which makes it insufficient to correct spherical aberration, and is therefore not desirable. Furthermore, a relative increase in the refractive power of the image side lens group G2 increases the coma aberration generated in this image side lens group G2 too high, and makes it impossible to obtain excellent optical performance.

To insure the effect of the present embodiment, it is preferable that the upper limit value of conditional Expression (2) is 0.45. To further insure the effect of the present embodiment, it is preferable that the upper limit value of conditional Expression (2) is 0.43. To still further insure the effect of the present embodiment, it is preferable that the upper limit value of conditional Expression (2) is 0.40.

To insure the effect of the present embodiment, it is preferable that the lower limit value of the conditional Expression (2) is 0.10. To further insure the effect of the present embodiment, it is preferable that the lower limit value of the conditional Expression (2) is 0.12. To further insure the effect of the present embodiment, it is preferable that the lower limit value of the conditional Expression (2) is 0.14.

It is preferable that the conditional Expression (3) is satisfied, where f denotes a focal length of the image-capturing lens, and fs denotes a focal length of the shift lens group.

$$0.80<f/|fs|<1.10 \qquad (3)$$

Conditional Expression (3) specifies the focal length fs of the shift lens group. If conditions exceed the upper limit value of the conditional Expression (3), the refractive power of the shift lens group becomes strong, which increases the spherical aberration generated in the image side lens group G2 alone, and is therefore not desirable. If conditions are below the lower limit value of conditional Expression (3), on the other hand, the refractive power of the shift lens group becomes weak, and the image-capturing lens is no longer afocal, which increases the change of curvature of field upon shifting the lens, and is therefore not desirable.

To insure the effect of the present embodiment, it is preferable that the upper limit value of the conditional Expression (3) is 1.07. To further insure the effect of the present embodiment, it is preferable that the upper limit value of the conditional Expression (3) is 1.05.

To insure the effect of the present embodiment, it is preferable that the lower limit value of the conditional Expression (3) is 0.83. To further insure the effect of the present embodiment, it is preferable that the lower limit value of the conditional Expression (3) is 0.86. To further insure the effect of the present embodiment, it is preferable that the lower limit value of the conditional Expression (3) is 0.90.

In order to minimize the coma aberration and curvature of field generated in the object side lens group G1 alone, it is preferable that the following conditional Expression (4) is satisfied, where r1R denotes a radius of curvature of the image side surface of the lens closest to the object (lens L1 in FIG. 1) in the object side lens group G1, and r2F denotes a radius of curvature of the object side surface of the lens disposed at the image side of the lens closest to the object (lens L2 in FIG. 1).

$$0.0<(r2F+r1R)/(r2F-r1R)<24.8 \qquad (4)$$

Conditional Expression (4) is for appropriately correcting the coma aberration and curvature of field which are generated in the object side lens group G1 alone. If the conditions exceed the upper limit value of conditional Expression (4), the coma aberration and curvature of field generated in the object side lens group G1 alone can no longer be corrected. Distortion also increases, which is not desirable. If conditions are below the lower limit values of conditional Expression (4), on the other hand, the coma aberration generated in the object side lens group G1 alone increases so much that performance in the shortest image-capture distance deteriorates, which is not desirable.

To insure the effect of the present embodiment, it is preferable that the upper limit value of conditional Expression (4) is 22.80. To further insure the effect of the present embodiment, it is preferable that the upper limit value of conditional Expression (4) is 20.80. To still further insure the effect of the present embodiment, it is preferable that the upper limit value of conditional Expression (4) is 19.00.

To insure the effect of the present embodiment, it is preferable that the lower limit value of the conditional Expression (4) is 2.00. To further insure the effect of the present embodiment, it is preferable that the lower limit value of the conditional Expression (4) is 3.50. To further insure the effect of the present embodiment, it is preferable that the lower limit value of the conditional Expression (4) is 5.00.

In order to reduce size and improve performance, it is preferable that the following conditional Expression (5) is satisfied, where TL denotes a total length of the image-capturing lens (distance, on the optical axis, from the object side face of the lens disposed closest to the object to the image plane), and $\Sigma d$ denotes a length, on the optical axis, from a lens surface closest to the object (surface number 1 in FIG. 1) in the object side lens group G1 to a lens surface closest to the image (surface number 15 in FIG. 1) in the image side lens group G2.

$$1.5 < TL/\Sigma d < 2.3 \qquad (5)$$

The conditional Expression (5) specifies the appropriate total length TL of the image-capturing lens for balancing reducing size and improving performance. If conditions exceed the upper limit value of the conditional Expression (5), it is advantageous in terms of correcting aberrations, but the total length of the image-capturing lens increases, and reducing size and improving performance cannot be balanced, which is not desirable. If conditions are below the lower limit value in the conditional Expression (5), on the other hand, it is advantageous in terms of reducing size, but spherical aberration, coma aberration and curvature of field, which are generated in the image-capturing lens, cannot be corrected well. Furthermore it is difficult to increase back focus, which is not desirable.

To insure the effect of the present embodiment, it is preferable that the upper limit value of conditional Expression (5) is 2.25. To further insure the effect of the present embodiment, it is preferable that the upper limit value of conditional Expression (5) is 2.20. To still further insure the effect of the present embodiment, it is preferable that the upper limit value of conditional Expression (5) is 2.15.

To insure the effect of the present embodiment, it is preferable that the lower limit value of the conditional Expression (5) is 1.55. To further insure the effect of the present embodiment, it is preferable that the lower limit value of the conditional Expression (5) is 1.60. To further insure the effect of the present embodiment, it is preferable that the lower limit value of the conditional Expression (5) is 1.65.

In order to secure a long back focus despite small size, it is preferable that the object side lens group G1 has positive refractive power. According to the present embodiment, not only a long back focus, with respect to the total length of the image-capturing lens, can be implemented, but coma aberration and curvature of field can also be corrected well, by disposing a lens having a weak positive refractive power in the object side lens group G1. According to the present embodiment, to sufficiently exhibit these effects, it is preferable that the lens disposed closest to the object (lens L1 in FIG. 1) in the object side lens group G1 is a concave meniscus lens having a convex surface facing the object.

It is preferable that the focusing lens group is the shift lens group. It is also preferable that the focal length of the image-capturing lens is fixed.

In order to improve performance, it is preferable that the image side lens group G2 has a positive lens component, and the positive lens component includes at least one spherical surface. Because of this configuration, fluctuation of distortion and curvature of field, which is generated upon focusing, can be corrected well.

Also in order to improve performance, it is preferable that an aperture stop S is disposed between the objective side lens group G1 and the image side lens group G2. According to this configuration, the refractive power arrangement becomes closer to symmetric, that is, the objective side lens group G1 having positive refractive power, the aperture stop S, and the image side lens group G2 having positive refractive power (in order from the object), and curvature of field and distortion can be corrected well.

It is preferable that the image side lens group G2 has a negative lens component disposed closest to the object, and positive lens component disposed at the image side of the negative lens component. Furthermore, it is preferable that the image side lens group G2 has a cemented lens of a negative lens component and a positive lens component, having a positive or negative refractive power. Because of this configuration, chromatic aberration and curvature of field can be corrected well. It is preferable that the cemented lens of the image lens group G2 has a negative meniscus lens having a concave surface facing the object, and a positive meniscus lens having a convex surface facing the image. Because of this configuration, curvature of field can be corrected well.

Figure 28:
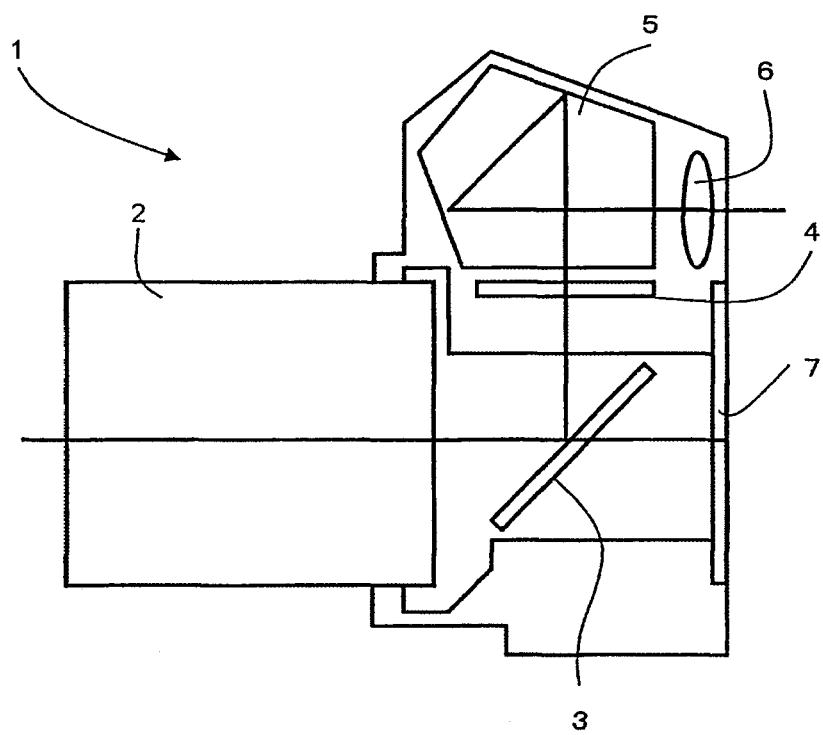
FIG. 28 is a cross-sectional view depicting a digital single lens reflex camera having the image-capturing lens according to the present embodiment.

FIG. 28 shows a cross-sectional view of a digital single lens reflex camera 1 (optical apparatus) having an image-capturing lens with the above configuration. In the digital single lens reflex camera 1 shown in FIG. 28, lights from an object, which is not illustrated, are collected by the image-capturing lens 2, and form an image on a focal plane plate 4 via a quick return mirror 3. The lights which formed an image on the focal plane plate 4 are reflected a plurality of times in a penta prism 5, and guided to an eye piece 6. Thereby the user can observe the object image as an upright image via the eye piece 6.

If the user presses a release button, which is not illustrated, the quick return mirror 3 is retracted from the optical path, and the lights of the object, which is not illustrated, are collected by the image-capturing lens 2, form an object image on a picture element 7. Thus the lights from the object are captured by the picture element 7, and are recorded in a memory, which is not illustrated, as an object image. In this way, the user can capture an image of the object using this camera 1. The camera 1 in FIG. 28 may removably hold the image-capturing lens 2, or may be integrated with the image-capturing lens 2.

Figure 29:
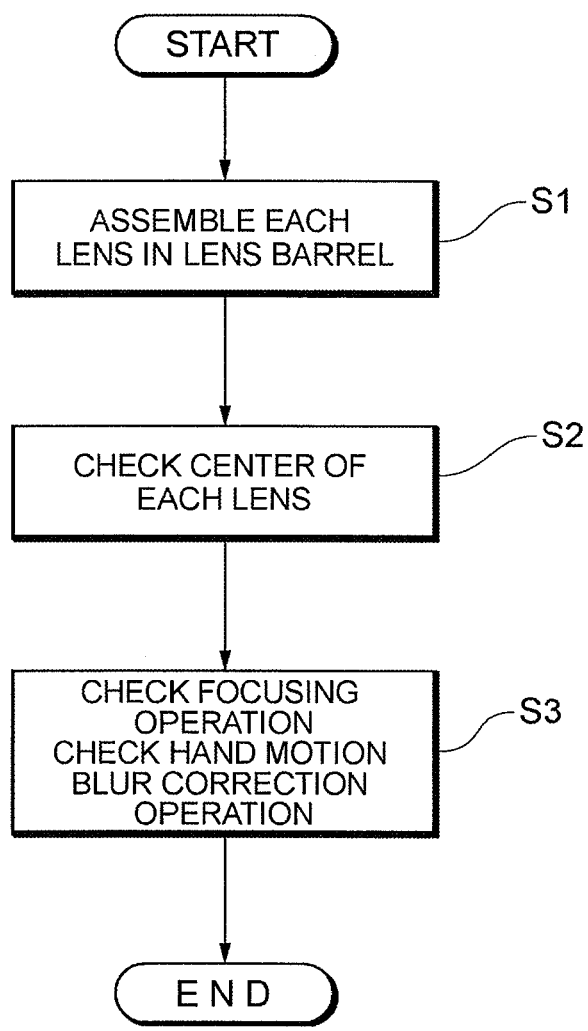
FIG. 29 is a flow chart depicting a method for manufacturing the image-capturing lens according to the present embodiment.

A method for manufacturing the image-capturing lens with the above configuration will be described with reference to FIG. 29. First lens groups G1 and G2 are assembled in a cylindrical lens barrel (step S1). When the lenses are assembled in the lens barrel, each lens group may be disposed sequentially in the lens barrel one at a time in order along the optical axis, or a part or all of the lenses may be integratedly held on a holding member, and then assembled in the lens barrel. After assembling each lens in the lens barrel, whether the object image is formed or not is checked in a state where each lens is assembled in the lens barrel, in other words, it is checked whether the center of each lens is aligned (step S2). Then various operations of the image-capturing lens are checked (step S3). Examples of the various operations are: a focusing operation in which lenses, which perform focusing from a distant object to a close object (image side lens group G2 in the present embodiment), move along the optical axis, and a hand motion blur correction operation, in which at least a part of the lenses (image side lens group G2 in the present embodiment) move so as to have components orthogonal to the optical axis. The sequence of checking various operations is arbitrary.

EXAMPLES

Each example according to the present embodiment will now be described with reference to the drawings. Table 1 to Table 8 shown below are tables listing the values of data according to Example 1 to Example 8. In [General Data], f is a focal length of this image-capturing lens, FNO is an F number, 2ω is an angle of view, Y is an image height, and TL is a total lens length. In [Lens Data], the surface number is a sequence of the lens surface counted from the object side along the light traveling direction, r is a radius of curvature of each lens surface, d is a distance from each optical surface to the next optical surface (or image plane) on the optical axis, nd is a refractive index at d-line (wavelength: 587.6 nm), and vd is an Abbe number at d-line. "*" attached at the surface number indicates that this lens surface is aspherical, and the column of the radius of curvature r indicates a paraxial radius of curvature. [0.0000] in the radius of curvature indicates a plane or an aperture. The refractive index of air, "1.00000", is omitted. In [Variable Distance Data], di (i is an integer) is a variable surface distance from the i-th surface to the next lens surface. In [Lens Group Data], the first surface and focal length of each group are shown. In [Conditional Expression], values corresponding to the above mentioned conditional Expressions (1) to (5) are shown.

In [Aspherical Data], the shape of the aspherical surface shown in [Lens Data] is given by the following Expression (a). In the following expression (a), y is the height in a direction perpendicular to the optical axis, S(y) is a distance (sag) from a tangential plane at a vertex of the aspherical surface to a position on the aspherical surface at height y along the optical axis, r is a radius of curvature (paraxial radius of curvature) of a reference spherical surface, κ is a conical coefficient, and An is an aspherical coefficient in degree n. In each example, the aspherical coefficient A2 of degree 2 is 0, which is omitted here. En means×$10^n$. For example 1.234 E−05=1.234×$10^{-5}$.

$$S(y)=(y^2/r)/\{1+(1-\kappa\cdot y^2/r^2)^{1/2}\}+A4 \times y^4+A6 \times y^6+A8 \times y^8+A10 \times y^{10} \quad (a)$$

In tables, "mm" is normally used for the unit of focal length f, radius of curvature r and surface distance d, and for other lengths. However another appropriate unit may be used instead, since an equivalent optical performance is obtained even if an optical system is proportionally expanded or proportionally reduced.

The description on tables is the same for other examples, where description thereof is omitted.

Example 1

Example 1 will be described with reference to FIG. 1 to FIG. 3 and Table 1. FIG. 1 is a diagram depicting a configuration of an image-capturing lens according to Example 1, and a moving state of each lens upon a focusing state changing from focusing on infinity to focusing on a close distance. In this example, "close distance" means a −0.025× image-capturing distance.

As FIG. 1 shows, the image-capturing lens according to Example 1 has, in order from an object, an object side lens group G1 having positive refractive power, an image side lens group G2 having positive refractive power, and a filter group FL constituted by a low pass filter, infrared cut filter, or the like. Upon a focusing state Changing from focusing on infinity to focusing on close distance, that is upon focusing, the object side lens group G1 is fixed with respect to the image plane I and the image side lens group G2 moves with respect to the image plane I, and the distance between the object side lens group G1 and the image side lens group G2 (axial air space d7 in Table 1), and the distance between the image side lens group G2 and the filter group FL (axial air space d15 in Table 1) changes. The image plane I is formed on a picture element 7 in FIG. 28, and the picture element is constituted by a CCD, CMOS or the like.

The object side lens group G1 has, in order from the object, a negative meniscus lens L1 having a convex surface facing the object, a biconvex positive lens L2, and a negative meniscus lens L3 having a convex surface facing the object.

The image side lens group G2 has, in order from the object, a negative cemented lens of a negative meniscus lens L4 having a concave surface facing the object and a positive meniscus lens L5 having a convex surface facing the image, and a positive meniscus lens L6 having a convex surface facing the object and a positive meniscus lens L7 having a convex surface facing the image. A hand motion blur is corrected by moving the image side lens group G2 so as to have components roughly orthogonal to the optical axis, in order to shift the image on the image plane I upon the occurrence of an image blur.

An aperture stop S is disposed between the object side lens group G1 and the image side lens group G2. The aperture stop S is fixed with respect to the object side lens group G1, upon focusing from the state of focusing on infinity to the state of focusing on close distance.

Table 1 shows each data of Example 1. The surface numbers 1 to 17 in Table 1 correspond to the surfaces 1 to 17 in FIG. 1.

TABLE 1

[General Data]

f = 36.01
FNO = 1.85
2ω = 43.77
Y = 14.10
TL = 92.00

[Lens Data]

| Surface Number | r | d | nd | vd |
|---|---|---|---|---|
| 1 | 132.7002 | 1.40 | 1.58913 | 61.18 |
| 2 | 25.8526 | 9.59 | | |
| 3 | 29.7335 | 5.09 | 1.77250 | 49.61 |
| 4 | −801.6732 | 0.10 | | |
| 5 | 20.3542 | 4.65 | 1.83400 | 37.17 |
| 6 | 15.3218 | 5.97 | | |
| 7 | 0.0000 | (d7) | (Aperture stop S) | |
| 8 | −15.0395 | 1.50 | 1.84666 | 23.78 |
| 9 | −662.9579 | 4.50 | 1.80400 | 46.58 |
| 10 | −27.5128 | 0.69 | | |
| *11 | −100.0000 | 0.05 | 1.55389 | 38.09 |
| 12 | −100.0000 | 4.39 | 1.80400 | 46.58 |
| 13 | −29.2280 | 0.10 | | |

TABLE 1-continued

| | | | | |
|---|---|---|---|---|
| 14 | −289.2477 | 3.73 | 1.80400 | 46.58 |
| 15 | −38.0644 | (d15) | | |
| 16 | 0.0000 | 1.50 | 1.51633 | 64.15 |
| 17 | 0.0000 | 0.50 | | |

[Aspherical Data]
Eleventh surface r = −100.0000, κ = +1.0000,
C4 = −8.7071-06, C6 = +5.0224E−09, C8 = −4.5994E−12,
C10 = +0.0000E−00

[Variable Distance Upon Focusing]

| | Infinity | Close Distance |
|---|---|---|
| d7 | 11.2452 | 10.3029 |
| d15 | 37.0000 | 37.9423 |

[Lens Group Data]

| Group number | First surface of group | Focal length of group |
|---|---|---|
| G1 | 1 | 160.3373 |
| G2 | 8 | 36.5875 |

[Conditional Expressions]

f = 36.0091
f1 = 160.3373
f2 = 36.5875
fs = 36.5875
r1R = 25.8526
r2F = 29.7335
TL = 91.9995
Σd = 53.0001
Σd2 = 14.9549
Conditional Expression (1) Σd2/f = 0.4153
Conditional Expression (2) |f2|/|f1| = 0.2282
Conditional Expression (3) f/|fs| = 0.9842
Conditional Expression (4) (r2F + r1R)/(r2F − r1R) = 14.3231
Conditional Expression (5) TL/Σd = 1.7358

As shown in the data table in Table 1, the image-capturing lens according to this example satisfies all the conditional Expressions (1) to (5).

Figure 2B:
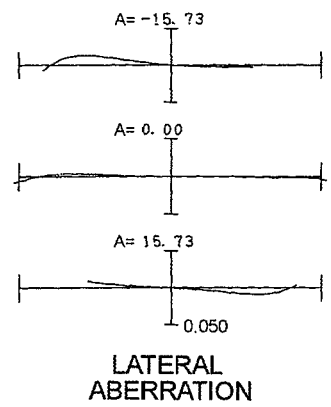
Figure 3:
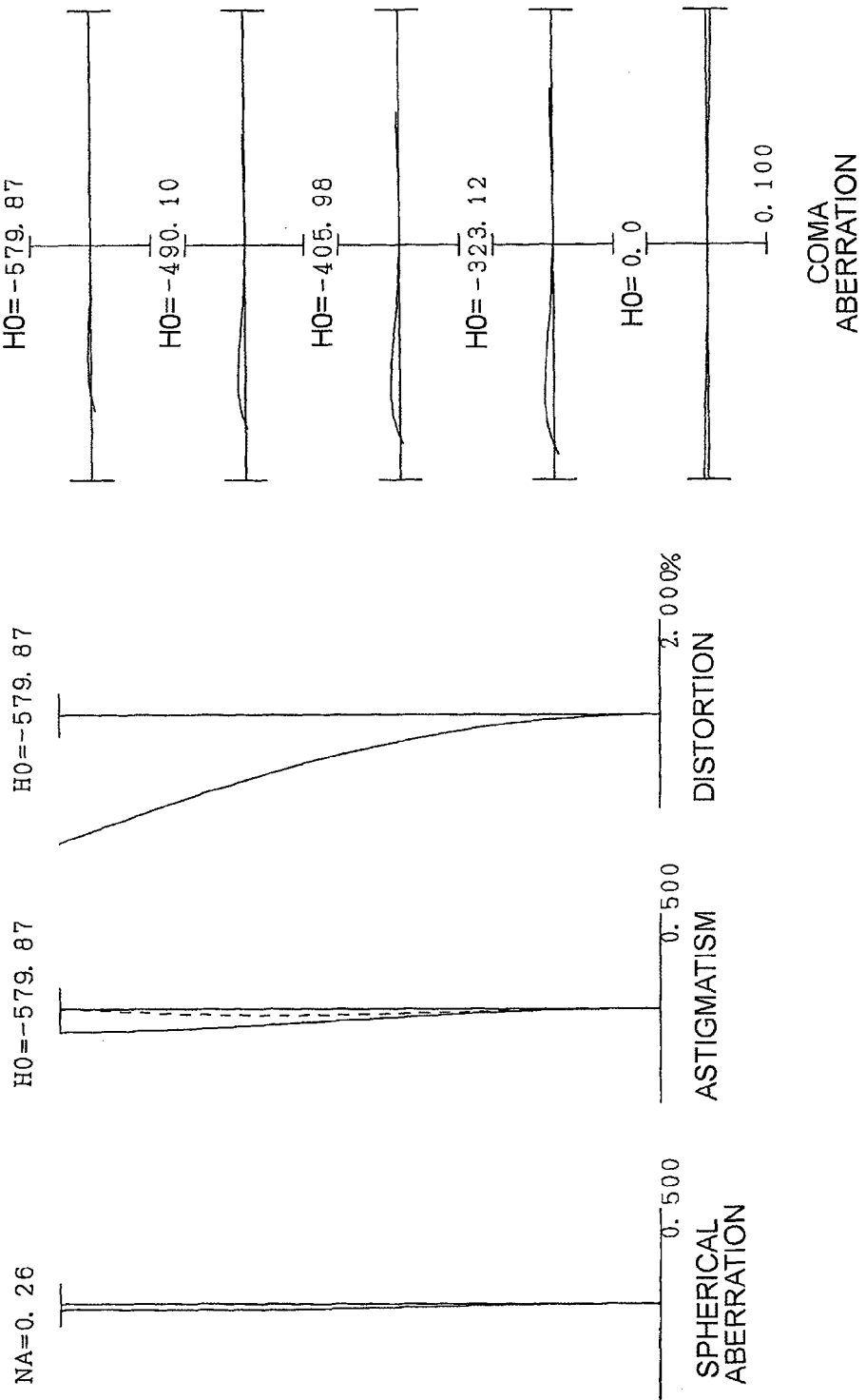
FIG. 3 are graphs showing various aberrations according to Example 1 upon focusing on close distance.

FIG. 2 are graphs showing various aberrations according to Example 1, where FIG. 2A are graphs showing various aberrations (spherical aberration, astigmatism, distortion and coma aberration in order from the left) upon focusing on infinity, and FIG. 2B are graphs showing lateral aberration when shifting lens (lens shift state) upon focusing on infinity (moving distance according to this example is 0.2 mm). FIG. 3 are graphs showing various aberrations (spherical aberration, astigmatism, distortion and coma aberration in order from the left) upon focusing on close distance in Example 1. In each graph showing aberration, FNO is an F number, A is a half angle of view with respect to each image height, and H0 is an object height with respect to each image height. In the graphs showing astigmatism, the solid line indicates the sagittal image surface, and the dotted line indicates the meridional image surface. All the aberrational curves are with respect to d-line (wavelength: 587.6 nm). The description on the graphs showing aberrations is the same for other examples.

As each graph showing aberrations clarifies, the image-capturing lens, according to Example 1, has excellent image forming performance, where various aberrations are corrected well in any state of focusing on infinity, lens shift state and state of focusing on close distance.

Example 2

Example 2 will be described with reference to FIG. 4 to FIG. 6 and Table 2. FIG. 4 is a diagram depicting a configuration of an image-capturing lens according to Example 2, and a moving state of each lens upon a focusing state changing from focusing on infinity to focusing on a close distance. In this example, "close distance" means a −0.020× image-capturing distance.

As FIG. 4 shows, the image-capturing lens according to Example 2 has, in order from an object, an object side lens group G1 having positive refractive power, an image side lens group G2 having positive refractive power, and a filter group FL constituted by a low pass filter, infrared cut filter, or the like. Upon a focusing state changing from focusing on infinity to focusing on close distance, that is upon focusing, the object side lens group G1 is fixed with respect to the image plane I and the image side lens group G2 moves with respect to the image plane I, and the distance between the object side lens group G1 and the image side lens group G2 (axial air space d7 in Table 2), and the distance between the image side lens group G2 and the filter group FL (axial air space d14 in Table 2) Changes. The image plane I is formed on a picture element 7 in FIG. 28, and the picture element is constituted by a CCD, CMOS or the like.

The object side lens group G1 has, in order from the object, a negative meniscus lens L1 having a convex surface facing the object, a biconvex positive lens L2, and a negative meniscus lens L3 having a convex surface facing the object.

The image side lens group G2 has, in order from the object, a negative meniscus lens L4 having a concave surface facing the object, a positive meniscus lens L5 having a convex surface facing the image, and a biconvex positive lens L6 having an aspherical surface facing the object. A hand motion blur is corrected by moving the image side lens group G2 so as to have components roughly orthogonal to the optical axis, in order to shift the image on the image plane I upon the occurrence of an image blur.

An aperture stop S is disposed between the object side lens group G1 and the image side lens group G2. The aperture stop S is fixed with respect to the object side lens group G1, upon focusing from the state of focusing on infinity to the state of focusing on close distance.

Table 2 shows each data of Example 2. The surface numbers 1 to 16 in Table 2 correspond to the surfaces 1 to 16 in FIG. 4.

TABLE 2

[General Data]

f = 36.00
FNO = 1.85
2ω = 45.58
Y = 14.10
TL = 86.50

[Lens Data]

| Surface Number | r | d | nd | νd |
|---|---|---|---|---|
| 1 | 424.2496 | 1.40 | 1.51633 | 64.15 |
| 2 | 23.2189 | 5.29 | | |
| 3 | 26.1583 | 5.92 | 1.72916 | 54.68 |
| 4 | −273.1932 | 0.10 | | |
| 5 | 14.9149 | 2.48 | 1.77250 | 49.60 |
| 6 | 12.3301 | 7.58 | | |
| 7 | 0.0000 | (d7) | (Aperture stop S) | |
| 8 | −15.0479 | 3.00 | 1.84666 | 23.78 |
| 9 | −274.2622 | 0.24 | | |
| 10 | −155.0749 | 6.00 | 1.77250 | 49.60 |
| 11 | −22.0079 | 0.10 | | |
| *12 | 164.5291 | 0.10 | 1.55389 | 38.09 |
| 13 | 164.5291 | 4.87 | 1.80400 | 46.58 |
| 14 | −31.2668 | (d14) | | |

TABLE 2-continued

| 15 | 0.0000 | 1.50 | 1.51633 | 64.15 |
| 16 | 0.0000 | 0.50 | | |

[Aspherical Data]
Twelfth surface r = +164.5291, κ = +1.0000,
C4 = −7.0870-06, C6 = +8.6197E−10, C8 = +1.4544E−11,
C10 = +0.0000E−00

[Variable Distance Upon Focusing]

| | Infinity | Close Distance |
|---|---|---|
| d7 | 10.4271 | 9.6606 |
| d14 | 37.0000 | 37.7665 |

[Lens Group Data]

| Group number | First surface of group | Focal length of group |
|---|---|---|
| G1 | 1 | 140.0061 |
| G2 | 8 | 36.1855 |

[Conditional Expressions]

f = 36.0001
f1 = 140.0061
f2 = 36.1855
fs = 36.1855
r1R = 23.2189
r2F = 26.1583
TL = 86.5000
Σd = 47.4999
Σd2 = 14.3094
Conditional Expression (1) Σd2/f = 0.3975
Conditional Expression (2) |f2|/|f1| = 0.2585
Conditional Expression (3) f/|fs| = 0.9949
Conditional Expression (4) (r2F + r1R)/(r2F − r1R) = 16.7985
Conditional Expression (5) TL/Σd = 1.8211

As shown in the data table in Table 2, the image-capturing lens according to this example satisfies all the conditional Expressions (1) to (5).

Figure 5A:
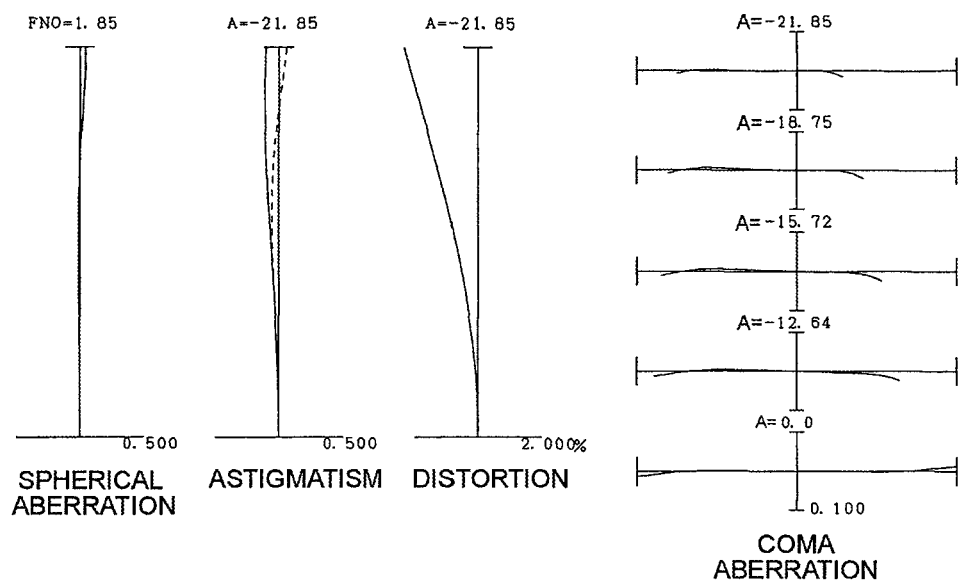
FIG. 5A are graphs showing various aberrations according to Example 2 upon focusing on infinity, and FIG. 5B are graphs showing lateral aberrations according to Example 2 in the lens shift state (0.2 mm)
Figure 5B:
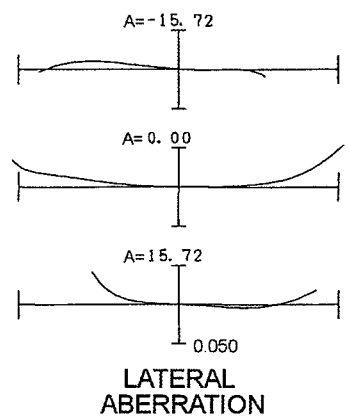
Figure 6:
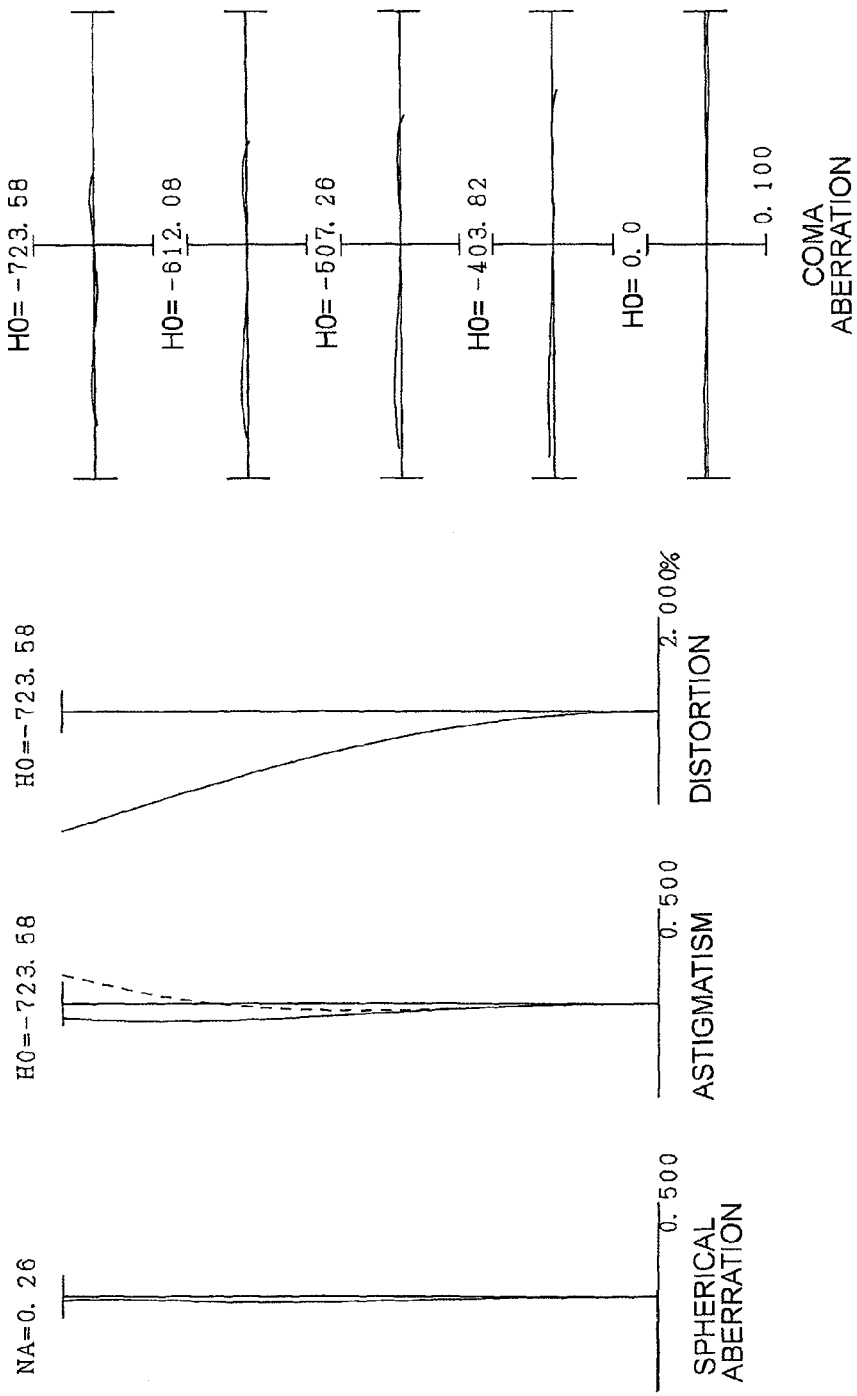
FIG. 6 are graphs showing various aberrations according to Example 2 upon focusing on close distance.

FIG. 5 are graphs showing various aberrations according to Example 2, where FIG. 5A are graphs showing various aberrations (spherical aberration, astigmatism, distortion and coma aberration in order from the left) upon focusing on infinity, and FIG. 5B are graphs showing lateral aberration when shifting lens (lens shift state) upon focusing on infinity (moving distance according to this example is 0.2 mm). FIG. 6 are graphs showing various aberrations (spherical aberration, astigmatism, distortion and coma aberration in order from the left) upon focusing on close distance. As each graph showing aberrations clarifies, the image-capturing lens, according to Example 2, has excellent image forming performance, where various aberrations are corrected well in any state of focusing on infinity, lens shift state and state of focusing on close distance.

Example 3

Example 3 will be described with reference to FIG. 7 to FIG. 9 and Table 3. FIG. 7 is a diagram depicting a configuration of an image-capturing lens according to Example 3, and a moving state of each lens upon a focusing state changing from focusing on infinity to focusing on a close distance. In this example, "close distance" means a −0.025× image-capturing distance.

As FIG. 7 shows, the image-capturing lens according to Example 3 has, in order from an object, an object side lens group G1 having positive refractive power, an image side lens group G2 having positive refractive power, and a filter group FL constituted by a low pass filter, infrared cut filter, or the like. Upon a focusing state changing from focusing on infinity to focusing on close distance, that is upon focusing, the object side lens group G1 is fixed with respect to the image plane I and the image side lens group G2 moves with respect to the image plane I, and the distance between the object side lens group G1 and the image side lens group G2 (axial air space d7 in Table 3), and the distance between the image side lens group G2 and the filter group FL (axial air space d13 in Table 3) changes. The image plane I is formed on a picture element 7 in FIG. 28, and the picture element is constituted by a CCD, CMOS or the like.

The object side lens group G1 has, in order from the object, a negative meniscus lens L1 having a convex surface facing the object, a biconvex positive lens L2, and a negative meniscus lens L3 having a convex surface facing the object.

The image side lens group G2 has, in order from the object, a negative cemented lens L45 of a negative meniscus lens L4 having a concave surface facing the object and a positive meniscus lens L5 having a convex surface facing the image, and a biconvex positive lens L6 having an aspherical surface facing the object. A hand motion blur is corrected by moving the image side lens group G2 so as to have components roughly orthogonal to the optical axis, in order to shift the image on the image plane I upon the occurrence of an Image blur.

An aperture stop S is disposed between the object side lens group G1 and the image side lens group G2. The aperture stop S is fixed with respect to the object side lens group G1, upon focusing from the state of focusing on infinity to the state of focusing on close distance.

Table 3 shows each data of Example 3. The surface numbers 1 to 15 in Table 3 correspond to the surfaces 1 to 15 in FIG. 7.

TABLE 3

[General Data]

f = 36.00
FNO = 1.85
2ω = 45.60
Y = 14.10
TL = 92.00

[Lens Data]

| Surface Number | r | d | nd | νd |
|---|---|---|---|---|
| 1 | 176.0137 | 1.40 | 1.58913 | 61.18 |
| 2 | 27.3013 | 9.07 | | |
| 3 | 33.2143 | 4.94 | 1.77250 | 49.61 |
| 4 | −347.2568 | 0.10 | | |
| 5 | 18.6027 | 4.45 | 1.84666 | 23.78 |
| 6 | 14.2382 | 6.90 | | |
| 7 | 0.0000 | (d7) | (Aperture stop S) | |
| 8 | −14.5276 | 1.10 | 1.84666 | 23.78 |
| 9 | −77.2310 | 5.59 | 1.77250 | 49.61 |
| 10 | −18.6999 | 1.67 | | |
| *11 | 172.8130 | 0.10 | 1.55389 | 38.09 |
| 12 | 172.8130 | 5.65 | 1.80400 | 46.58 |
| 13 | −34.0594 | (d13) | | |
| 14 | 0.0000 | 1.50 | 1.51633 | 64.14 |
| 15 | 0.0000 | 0.50 | | |

[Aspherical Data]
Eleventh surface r = +172.8130, κ = +1.0000,
C4 = −7.1412-06, C6 = +2.6456E−09, C8 = +4.0280E−12,
C10 = +0.0000E−00

TABLE 3-continued

[Variable Distance Upon Focusing]

| | Infinity | Close Distance |
|---|---|---|
| d7 | 11.9969 | 11.0759 |
| d13 | 37.0217 | 37.9427 |

[Lens Group Data]

| Group number | First surface of group | Focal length of group |
|---|---|---|
| G1 | 1 | 218.5857 |
| G2 | 8 | 36.0921 |

[Conditional Expressions]

f = 35.9951
f1 = 218.5857
f2 = 36.0921
fs = 36.0921
r1R = 27.3014
r2F = 33.2143
TL = 91.9897
Σd = 52.6810
Σd2 = 14.1100
Conditional Expression (1) Σd2/f = 0.3920
Conditional Expression (2) |f2|/|f1| = 0.1651
Conditional Expression (3) f/|fs| = 0.9973
Conditional Expression (4) (r2F + r1R)/(r2F − r1R) = 10.2344
Conditional Expression (5) TL/Σd = 1.7462

As shown in the data table in Table 3, the image-capturing lens according to this example satisfies all the conditional Expressions (1) to (5).

Figure 8A:
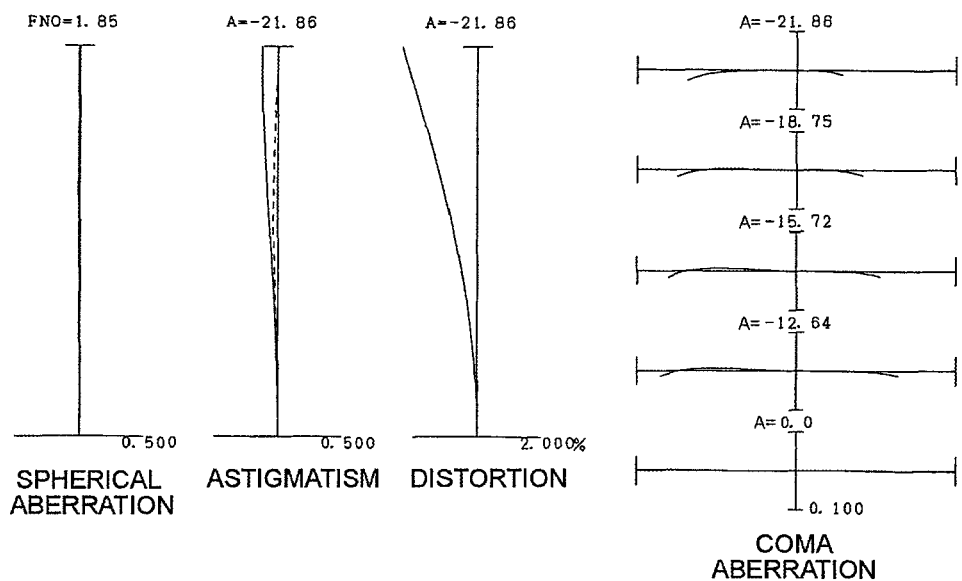
FIG. 8A are graphs showing various aberrations according to Example 3 upon focusing on infinity, and FIG. 8B are graphs showing lateral aberrations according to Example 3 in the lens shift state (0.2 mm)
Figure 8B:
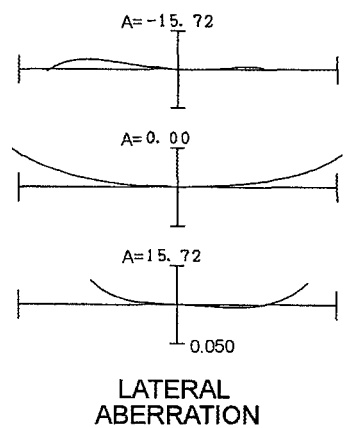
Figure 9:
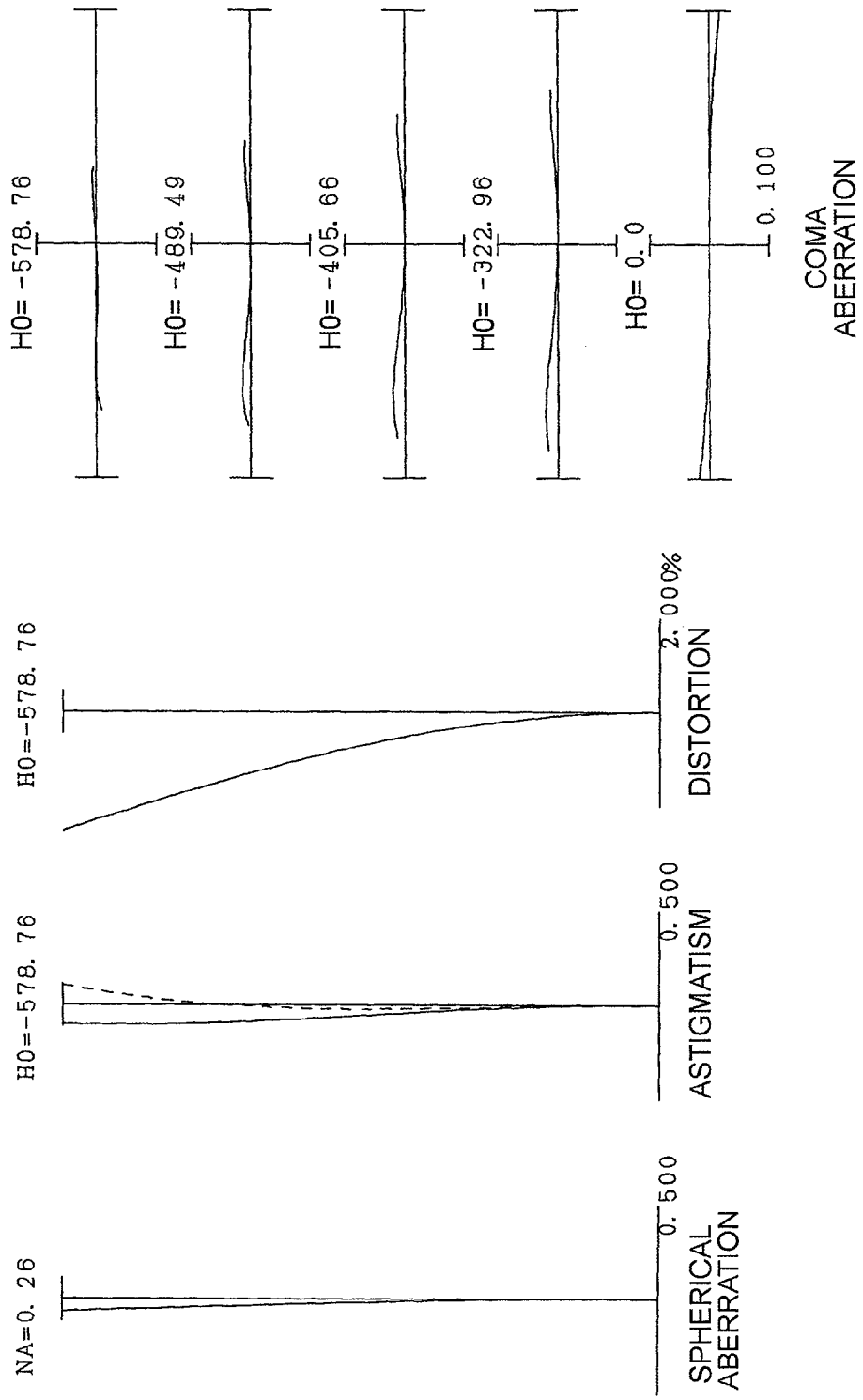
FIG. 9 are graphs showing various aberrations according to Example 3 upon focusing on close distance.

FIG. 8 are graphs showing various aberrations according to Example 3, where FIG. 8A are graphs showing various aberrations (spherical aberration, astigmatism, distortion and coma aberration in order from the left) upon focusing on infinity, and FIG. 8B are graphs showing lateral aberration when shifting lens (lens shift state) upon focusing on infinity (moving distance according to this example is 0.2 mm). FIG. 9 are graphs showing various aberrations (spherical aberration, astigmatism, distortion and coma aberration in order from the left) upon focusing on close distance in Example 3. As each graph showing aberrations clarifies, the image-capturing lens, according to Example 3, has excellent image forming performance, where various aberrations are corrected well in any state of focusing on infinity, lens shift state and state of focusing on close distance.

Example 4

Example 4 will be described with reference to FIG. 10 to FIG. 12 and Table 4. FIG. 10 is a diagram depicting a configuration of an image-capturing lens according to Example 4, and a moving state of each lens upon a focusing state changing from focusing on infinity to focusing on a close distance. In this example, "close distance" means a −0.025× image-capturing distance.

As FIG. 10 shows, the image-capturing lens according to Example 4 has, in order from an object, an object side lens group G1 having positive refractive power, an image side lens group G2 having positive refractive power, and a filter group FL constituted by a low pass filter, infrared cut filter, or the like. Upon a focusing state changing from focusing on infinity to focusing on close distance, that is upon focusing, the object side lens group G1 is fixed with respect to the image plane I and the image side lens group G2 moves with respect to the image plane I, and the distance between the object side lens group G1 and the image side lens group G2 (axial air space d7 in Table 4), and the distance between the image side lens group G2 and the filter group FL (axial air space d13 in Table 4) changes. The image plane I is formed on a picture element 7 in FIG. 28, and the picture element is constituted by a CCD, CMOS or the like.

The object side lens group G1 has, in order from the object, a negative meniscus lens L1 having a convex surface facing the object, a positive meniscus lens L2 having a convex surface facing the object, and a negative meniscus lens L3 having a convex surface facing the object.

The image side lens group G2 has, in order from the object, a negative meniscus lens L4 having a concave surface facing the object, a positive meniscus lens L5 having an aspherical surface facing the object and having a convex surface facing the image, and a biconvex positive lens L6 having an aspherical surface facing the object. A hand motion blur is corrected by moving the image side lens group G2 so as to have components roughly orthogonal to the optical axis, in order to shift the image on the image plane I upon the occurrence of an image blur.

An aperture stop S is disposed between the object side lens group G1 and the image side lens group G2. The aperture stop S is fixed with respect to the object side lens group G1, upon focusing from the state of focusing on infinity to the state of focusing on close distance.

Table 4 shows each data of Example 4. The surface numbers 1 to 15 in Table 4 correspond to the surfaces 1 to 15 in FIG. 10.

TABLE 4

[General Data]

f = 35.90
FNO = 1.85
2ω = 45.72
Y = 14.10
TL = 91.12

[Lens Data]

| Surface Number | r | d | nd | vd |
|---|---|---|---|---|
| 1 | 115.2190 | 1.40 | 1.58913 | 61.18 |
| 2 | 26.7689 | 9.51 | | |
| 3 | 29.8387 | 4.91 | 1.80400 | 46.58 |
| 4 | 703.4539 | 0.10 | | |
| 5 | 21.2098 | 4.32 | 1.84666 | 23.78 |
| 6 | 15.9246 | 5.69 | | |
| 7 | 0.0000 | (d7) | (Aperture stop S) | |
| 8 | −13.6299 | 1.46 | 1.84666 | 23.78 |
| 9 | −73.5907 | 0.15 | | |
| *10 | −87.6775 | 5.91 | 1.74443 | 49.55 |
| 11 | −18.4345 | 0.10 | | |
| 12 | 601.1271 | 4.87 | 1.80400 | 46.58 |
| 13 | −29.8090 | (d13) | | |
| 14 | 0.0000 | 1.50 | 1.51633 | 64.15 |
| 15 | 0.0000 | 0.50 | | |

[Aspherical Data]
Tenth surface r = −87.6775, κ = +1.0000,
C4 = −1.7876−05, C6 = +3.0218E−08, C8 = −2.3459E−11,
C10 = +0.0000E−00

[Variable Distance Upon Focusing]

| | Infinity | Close Distance |
|---|---|---|
| d7 | 13.3490 | 12.4207 |
| d13 | 37.3663 | 38.2946 |

TABLE 4-continued

[Lens Group Data]

| Group number | First surface of group | Focal length of group |
|---|---|---|
| G1 | 1 | 218.5857 |
| G2 | 8 | 36.0921 |

[Conditional Expressions]

f = 35.9049
f1 = 183.9771
f2 = 35.9800
fs = 35.9800
r1R = 26.7689
r2F = 29.8387
TL = 91.1222
Σd = 51.7561
Σd2 = 12.4848
Conditional Expression (1) Σd2/f = 0.3477
Conditional Expression (2) |f2|/|f1| = 0.1956
Conditional Expression (3) f/|fs| = 0.9979
Conditional Expression (4) (r2F + r1R)/(r2F − r1R) = 18.4402
Conditional Expression (5) TL/sd = 1.7607

As shown in the data table in Table 4, the image-capturing lens according to this example satisfies all the conditional Expressions (1) to (5).

Figure 11A:
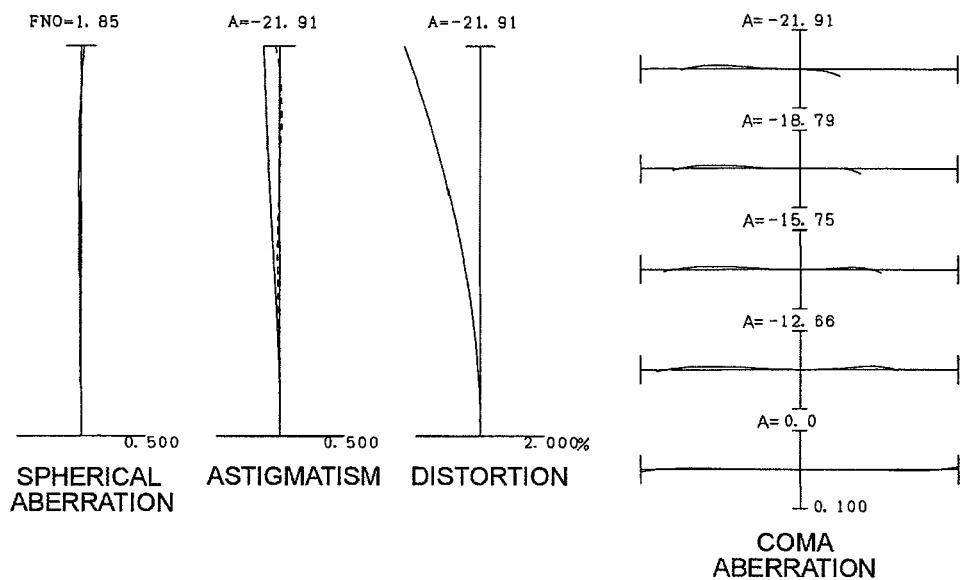
FIG. 11A are graphs showing various aberrations according to Example 4 upon focusing on infinity, and FIG. 11B are graphs showing lateral aberrations according to Example 4 in the lens shift state (0.2 mm)
Figure 11B:
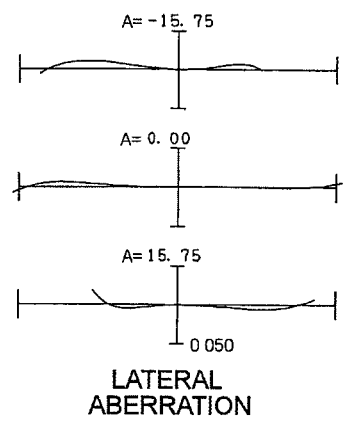
Figure 12:
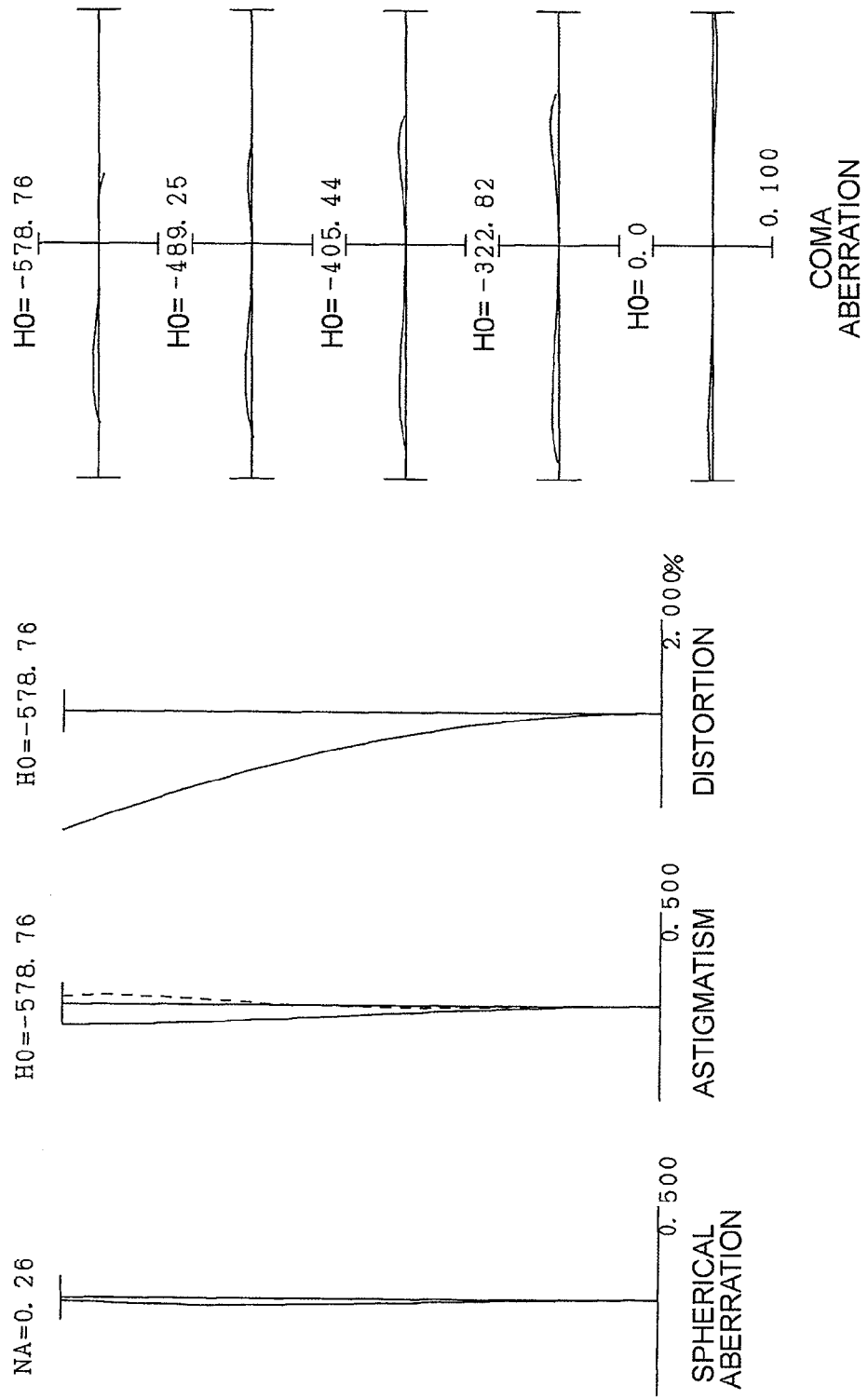
FIG. 12 are graphs showing various aberrations according to Example 4 upon focusing on close distance.

FIG. 11 are graphs showing various aberrations according to Example 4, where FIG. 11A are graphs showing various aberrations (spherical aberration, astigmatism, distortion and coma aberration in order from the left) upon focusing on infinity, and FIG. 11B are graphs showing lateral aberration when shifting lens (lens shift state) upon focusing on infinity (moving distance according to this example is 0.2 mm). FIG. 12 are graphs showing various aberrations (spherical aberration, astigmatism, distortion and coma aberration in order from the left) upon focusing on close distance in Example 4. As each graph showing aberrations clarifies, the image-capturing lens, according to Example 4, has excellent image forming performance, where various aberrations are corrected well in any state of focusing on infinity, lens shift state and state of focusing on close distance.

Example 5

Figure 13:
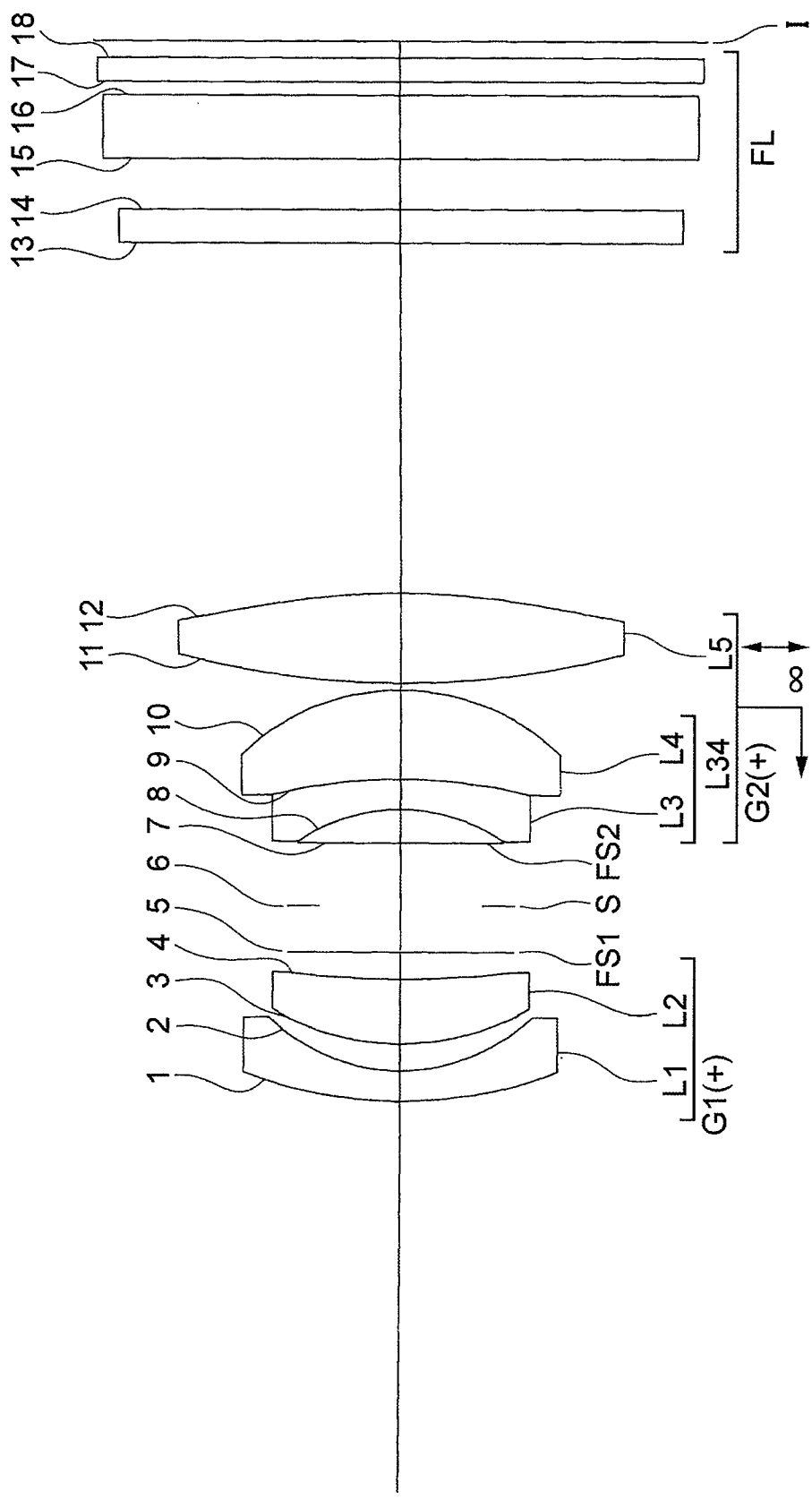
FIG. 13 is a diagram depicting a configuration of an image-capturing lens according to Example 5, and a state of movement of each lens upon changing from a state of focusing on infinity to a state of focusing on close distance.

Example 5 will be described with reference to FIG. 13 to FIG. 15 and Table 5. FIG. 13 is a diagram depicting a configuration of an image-capturing lens according to Example 5, and a moving state of each lens upon a focusing state changing from focusing on infinity to focusing on a close distance. In this example, "close distance" means a −0.015× image-capturing distance.

As FIG. 13 shows, the image-capturing lens according to Example 5 has, in order from an object, an object side lens group G1 having positive refractive power, an image side lens group G2 having positive refractive power, and a filter group FL constituted by a low pass filter, infrared cut filter, or the like. Upon a focusing state changing from focusing on infinity to focusing on close distance, that is upon focusing, the object side lens group G1 is fixed with respect to the image plane I and the image side lens group G2 moves with respect to the image plane I, and the distance between the object side lens group G1 and the image side lens group G2 (axial air space d6 in Table 5), and the distance between the image side lens group G2 and the filter group FL (axial air space d12 in Table 5) changes. The image plane I is formed on a picture element 7 in FIG. 28, and the picture element is constituted by a CCD, CMOS or the like.

The object side lens group G1 has, in order from the object, a negative meniscus lens L1 having a convex surface facing the object, and a positive meniscus lens L2 having a convex surface facing the object, The image side lens group G2 has, in order from the object, a cemented lens L34 of a negative meniscus lens L3 having a concave surface facing the object and a positive meniscus lens L4 having a convex surface facing the image, and a biconvex positive lens L5. A hand motion blur is corrected by moving the image side lens group G2 so as to have components roughly orthogonal to the optical axis, in order to shift the image on the image plane I upon the occurrence of an image blur.

An aperture stop S is disposed between the object side lens group G1 and the image side lens group G2. The aperture stop S is fixed with respect to the object side lens group G1, upon focusing from the state of focusing on infinity to the state of focusing on close distance.

Table 5 shows each data of Example 5. The surface numbers 1 to 18 in Table 5 correspond to the surfaces 1 to 18 in FIG. 13.

TABLE 5

[General Data]

f = 23.65
FNO = 2.83
2ω = 62.12
Y = 14.10
TL = 52.26

[Lens Data]

| Surface Number | r | d | nd | νd |
|---|---|---|---|---|
| 1 | 20.8248 | 1.49 | 1.67790 | 54.89 |
| *2 | 8.4932 | 1.33 | | |
| 3 | 11.9898 | 3.15 | 1.88300 | 40.76 |
| 4 | 41.9602 | 1.33 | | |
| 5 | 0.0000 | 2.32 | | |
| 6 | 0.0000 | (d6) | (Aperture stop S) | |
| 7 | 0.0000 | 1.66 | | |
| 8 | −8.5583 | 1.49 | 1.80810 | 22.76 |
| 9 | −25.0429 | 4.40 | 1.75500 | 52.32 |
| 10 | −10.8285 | 0.33 | | |
| 11 | 41.5491 | 4.48 | 1.58913 | 61.16 |
| *12 | −32.8459 | (d12) | | |
| 13 | 0.0000 | 1.66 | 1.51633 | 64.14 |
| 14 | 0.0000 | 2.49 | | |
| 15 | 0.0000 | 3.10 | 1.51633 | 64.14 |
| 16 | 0.0000 | 0.66 | | |
| 17 | 0.0000 | 1.16 | 1.51633 | 64.14 |
| 18 | 0.0000 | 0.84 | | |

[Aspherical Data]

Second surface r = +8.4932, κ = +0.9952,
C4 = −7.7765−05, C6 = −1.1015E−06, C8 = −1.8637E−09,
C10 = −2.9666E−10

Twelfth surface r = −32.8459, κ = +5.2781,
C4 = +4.8095−05, C6 = +8.4234E−09, C8 = +8.5569E−12,
C10 = −2.8256E−12

[Variable Distance Upon Focusing]

| | Infinity | Close Distance |
|---|---|---|
| d6 | 3.0711 | 2.7029 |
| d12 | 17.2992 | 17.6675 |

TABLE 5-continued

[Lens Group Data]

| Group number | First surface of group | Focal length of group |
|---|---|---|
| G1 | 1 | 96.5825 |
| G2 | 8 | 24.8384 |

[Conditional Expressions]

f = 23.6481
f1 = 96.5825
f2 = 24.8384
fs = 24.8384
r1R = 8.4932
r2F = 11.9898
TL = 52.2625
Σd = 25.0505
Σd2 = 10.6994
Conditional Expression (1) Σd2/f = 0.4524
Conditional Expression (2) |f2|/|f1| = 0.2572
Conditional Expression (3) f/|fs| = 0.9521
Conditional Expression (4) (r2F + r1R)/(r2F − r1R) = 5.8579
Conditional Expression (5) TL/Σd = 2.0863

As shown in the data table in Table 5, the image-capturing lens according to this example satisfies all the conditional Expressions (1) to (5).

Figure 14A:
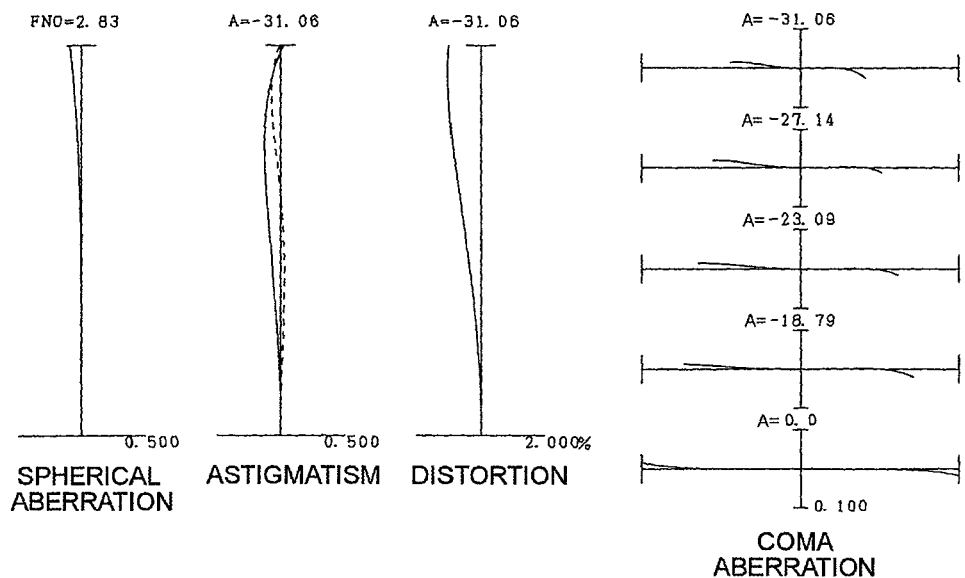
FIG. 14A are graphs showing various aberrations according to Example 5 upon focusing on infinity, and FIG. 14B are graphs showing lateral aberrations according to Example 5 in the lens shift state (0.15 mm)
Figure 14B:
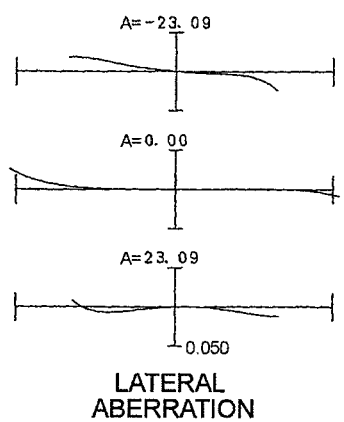
Figure 15:
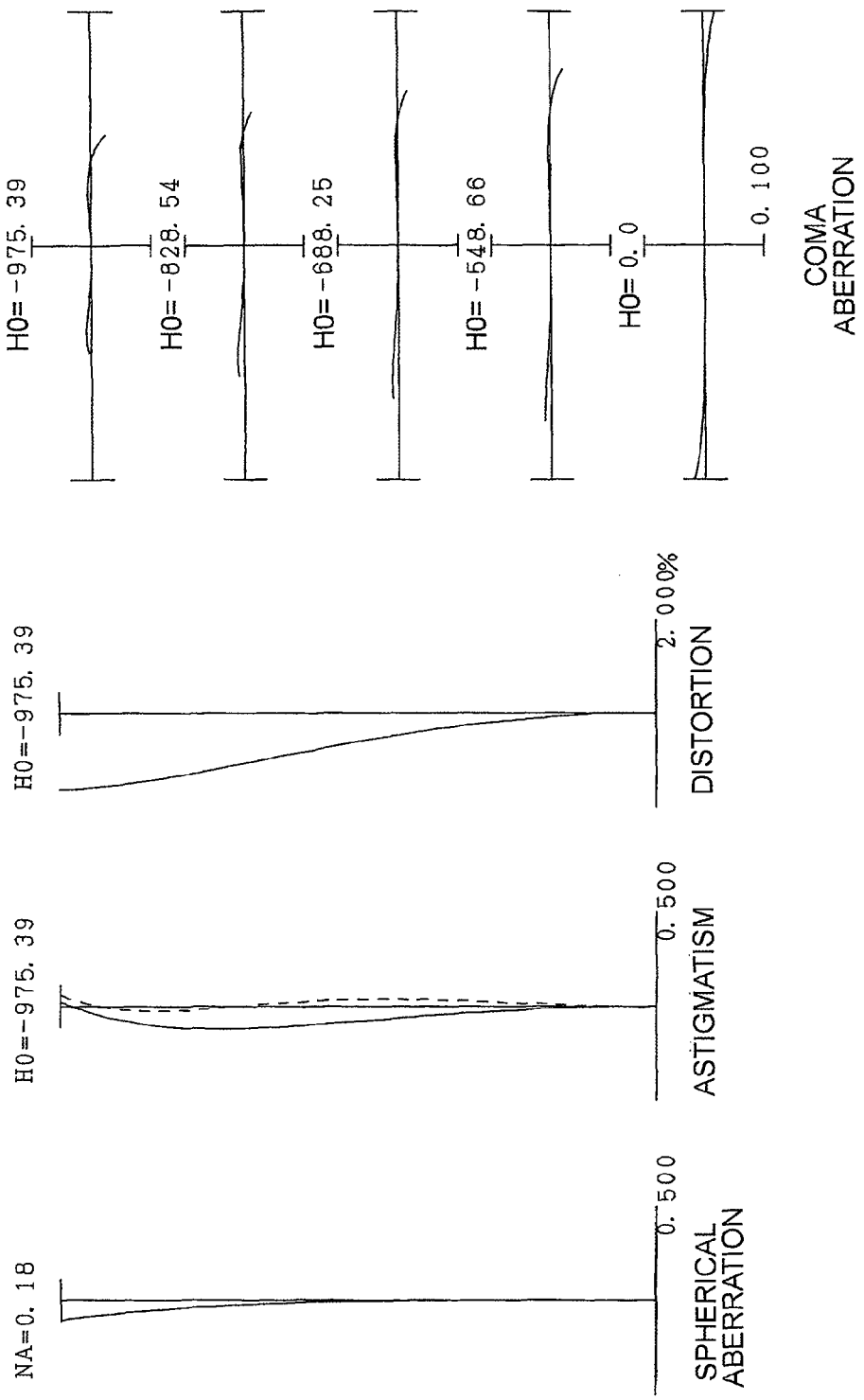
FIG. 15 are graphs showing various aberrations according to Example 5 upon focusing on close distance.

FIG. 14 are graphs showing various aberrations according to Example 5, where FIG. 14A are graphs showing various aberrations (spherical aberration, astigmatism, distortion and coma aberration in order from the left) upon focusing on infinity, and FIG. 14B are graphs showing lateral aberration when shifting lens (lens shift state) upon focusing on infinity (moving distance according to this example is 0.15 mm). FIG. 15 are graphs showing various aberrations (spherical aberration, astigmatism, distortion and coma aberration in order from the left) upon focusing on close distance in Example 5. As each graph showing aberrations clarifies, the image-capturing lens, according to Example 5, has excellent image forming performance, where various aberrations are corrected well in any state of focusing on infinity, lens shift state and state of focusing on close distance.

Example 6

Figure 16:
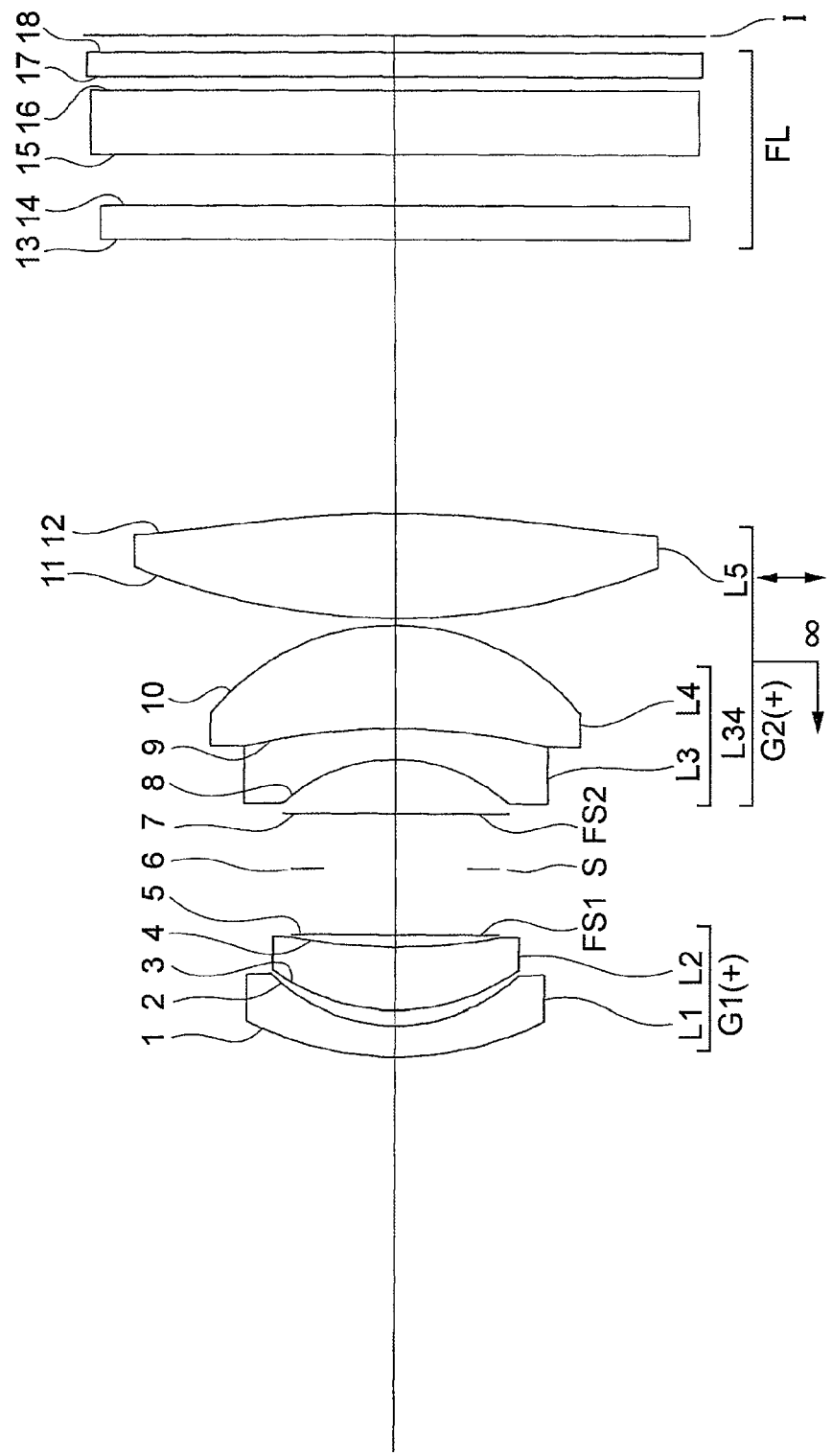
FIG. 16 is a diagram depicting a configuration of an image-capturing lens according to Example 6, and a state of movement of each lens upon changing from a state of focusing on infinity to a state of focusing on close distance.

Example 6 will be described with reference to FIG. 16 to FIG. 18 and Table 6. FIG. 16 is a diagram depicting a configuration of an image-capturing lens according to Example 6, and a moving state of each lens upon a focusing state changing from focusing on infinity to focusing on a close distance. In this example, "close distance" means a −0.015× image-capturing distance.

As FIG. 16 shows, the image-capturing lens according to Example 6 has, in order from an object, an object side lens group G1 having positive refractive power, an image side lens group. G2 having positive refractive power, and a filter group FL constituted by a low pass filter, infrared cut filter, or the like. Upon a focusing state changing from focusing on infinity to focusing on close distance, that is upon focusing, the object side lens group G1 is fixed with respect to the image plane I and the image side lens group G2 moves with respect to the image plane I, and the distance between the object side lens group G1 and the image side lens group G2 (axial air space d6 in Table 6), and the distance between the image side lens group G2 and the filter group FL (axial air space d12 in Table 6) changes. The image plane I is formed on a picture element 7 in FIG. 28, and the picture element is constituted by a CCD, CMOS or the like.

The object side lens group G1 has, in order from the object, a negative meniscus lens L1 having a convex surface facing the object, and a positive meniscus lens L2 having a convex surface facing the object.

The image side lens group G2 has, in order from the object, a cemented lens L34 of a negative meniscus lens L3 having a concave surface facing the object and a positive meniscus lens L4 having a convex surface facing the image, and a biconvex positive lens L5. A hand motion blur is corrected by moving the image side lens group G2 so as to have components roughly orthogonal to the optical axis, in order to shift the image on the image plane I upon the occurrence of an image blur.

An aperture stop S is disposed between the object side lens group G1 and the image side lens group G2. The aperture stop S is fixed with respect to the object side lens group G1, upon focusing from the state of focusing on infinity to the state of focusing on close distance.

Table 6 shows each data of Example 6. The surface numbers 1 to 18 in Table 6 correspond to the surfaces 1 to 18 in FIG. 16.

TABLE 6

[General Data]

f = 23.65
FNO = 2.92
2ω = 62.12
Y = 14.10
TL = 49.76

[Lens Data]

| Surface Number | r | d | nd | νd |
|---|---|---|---|---|
| 1 | 15.5132 | 1.49 | 1.67790 | 54.89 |
| *2 | 7.9969 | 0.75 | | |
| 3 | 9.8164 | 3.07 | 1.81600 | 46.62 |
| 4 | 26.4969 | 0.58 | | |
| 5 | 0.0000 | 3.23 | | |
| 6 | 0.0000 | (d6) | (Aperture stop S) | |
| 7 | 0.0000 | 2.65 | | |
| 8 | −7.7711 | 1.49 | 1.80810 | 22.76 |
| 9 | −30.7203 | 5.04 | 1.81600 | 46.62 |
| 10 | −11.2008 | 0.33 | | |
| 11 | 32.3560 | 5.14 | 1.66910 | 55.42 |
| *12 | −46.7559 | (d12) | | |
| 13 | 0.0000 | 1.66 | 1.51633 | 64.14 |
| 14 | 0.0000 | 2.49 | | |
| 15 | 0.0000 | 3.10 | 1.51633 | 64.14 |
| 16 | 0.0000 | 0.66 | | |
| 17 | 0.0000 | 1.16 | 1.51633 | 64.14 |
| 18 | 0.0000 | 0.83 | | |

[Aspherical Data]

Second surface r = +7.9969, κ = −2.2502,
C4 = +7.1979E−04, C6 = −8.7714E−06, C8 = +1.8061E−07,
C10 = −1.6854E−09

Twelfth surface r = −46.7559, κ = +3.4098,
C4 = +3.2772E−05, C6 = −2.7331E−08, C8 = +1.4554E−10,
C10 = −6.2922E−13

[Variable Distance Upon Focusing]

| | Infinity | Close Distance |
|---|---|---|
| d6 | 2.6794 | 2.2766 |
| d12 | 13.3970 | 13.7998 |

TABLE 6-continued

[Lens Group Data]

| Group number | First surface of group | Focal length of group |
|---|---|---|
| G1 | 1 | 61.3133 |
| G2 | 8 | 23.2327 |

[Conditional Expressions]

f = 23.6481
f1 = 61.3133
f2 = 23.2327
fs = 23.2327
r1R = 7.9969
r2F = 9.8164
TL = 49.7627
Σd = 26.4644
Σd2 = 12.0064
Conditional Expression (1) Σd2/f = 0.5077
Conditional Expression (2) |f2|/|f1| = 0.3789
Conditional Expression (3) f/|fs| = 1.0179
Conditional Expression (4) (r2F + r1R)/(r2F − r1R) = 9.7902
Conditional Expression (5) TL/Σd = 1.8804

As shown in the data table in Table 6, the image-capturing lens according to this example satisfies all the conditional Expressions (1) to (5).

Figure 17A:
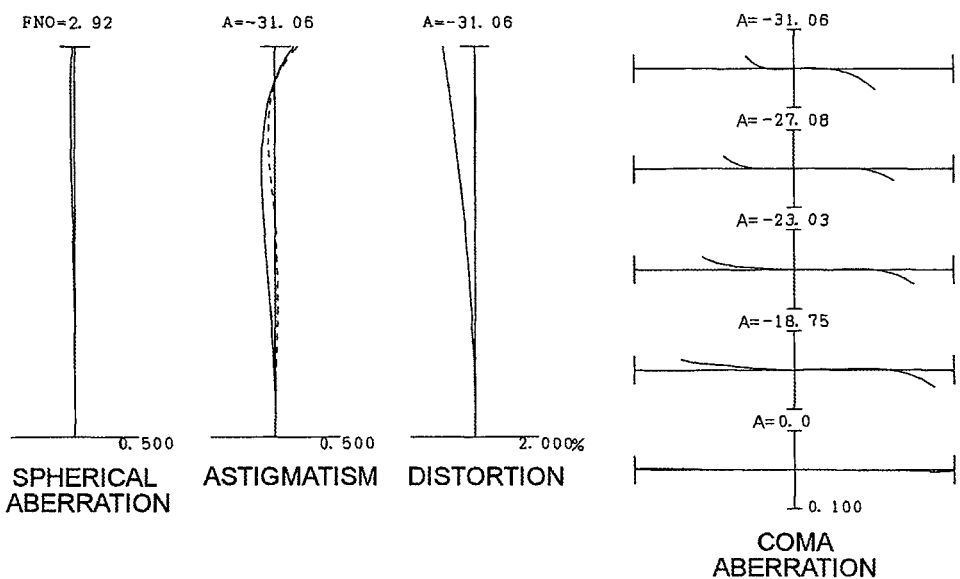
FIG. 17A are graphs showing various aberrations according to Example 6 upon focusing on infinity, and FIG. 17B are graphs showing lateral aberrations according to Example 6 in the lens shift state (0.15 mm)
Figure 17B:
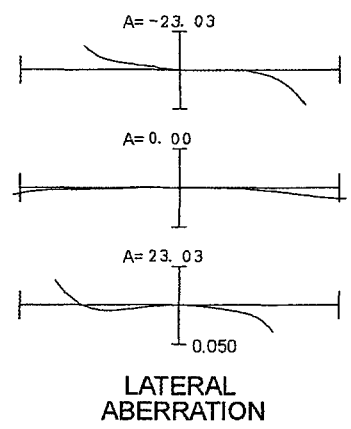
Figure 18:
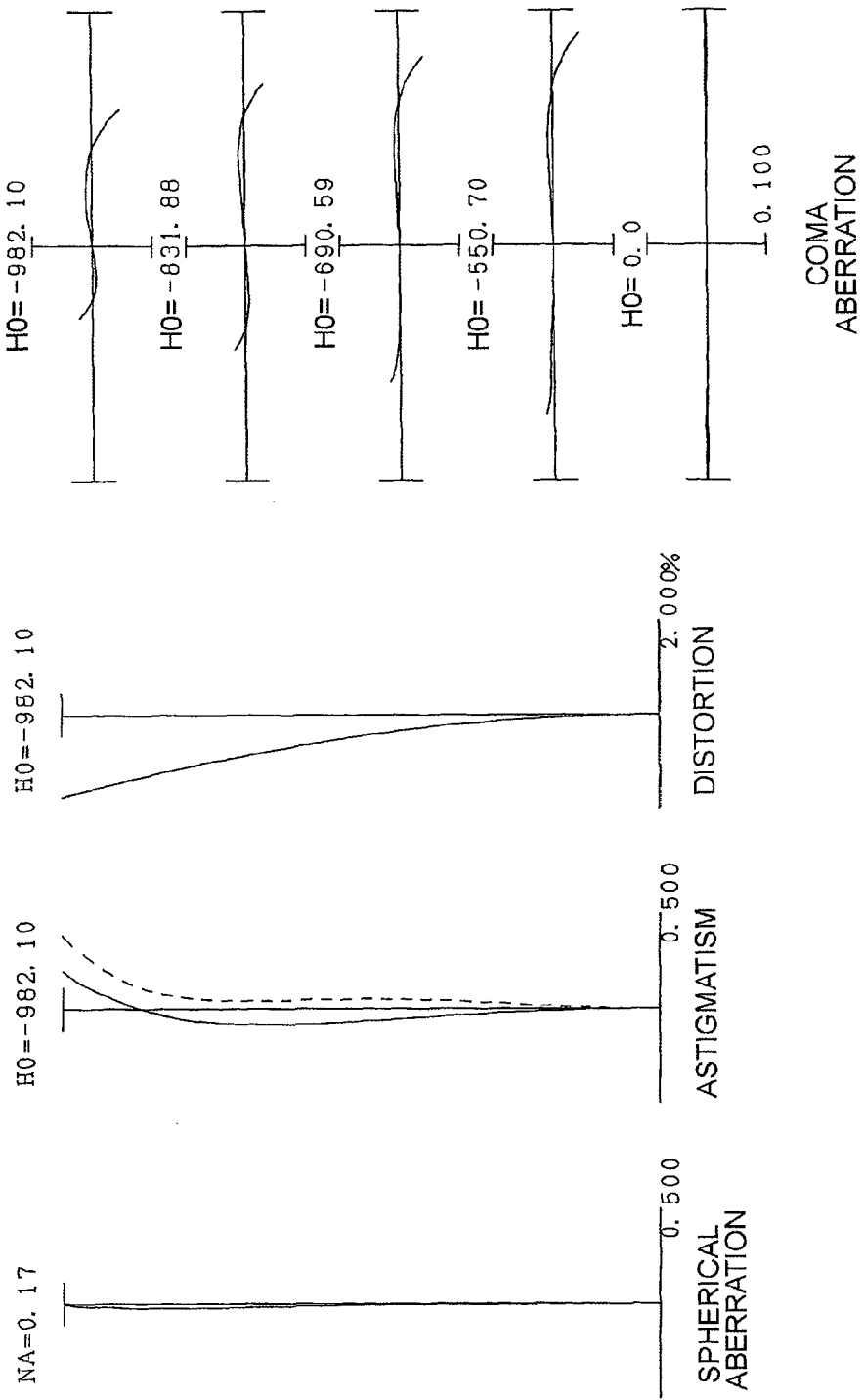
FIG. 18 are graphs showing various aberrations according to Example 6 upon focusing on close distance.

FIG. 17 are graphs showing various aberrations according to Example 6, where FIG. 17A are graphs showing various aberrations (spherical aberration, astigmatism, distortion and coma aberration in order from the left) upon focusing on infinity, and FIG. 17B are graphs showing lateral aberration when shifting lens (lens shift state) upon focusing on infinity (moving distance according to this example is 0.15 mm). FIG. 18 are graphs showing various aberrations (spherical aberration, astigmatism, distortion and coma aberration in order from the left) upon focusing on close distance in Example 6. As each graph showing aberrations clarifies, the image-capturing lens, according to Example 6, has excellent image forming performance, where various aberrations are corrected well in any state of focusing on infinity, lens shift state and state of focusing on close distance.

Example 7

Figure 19:
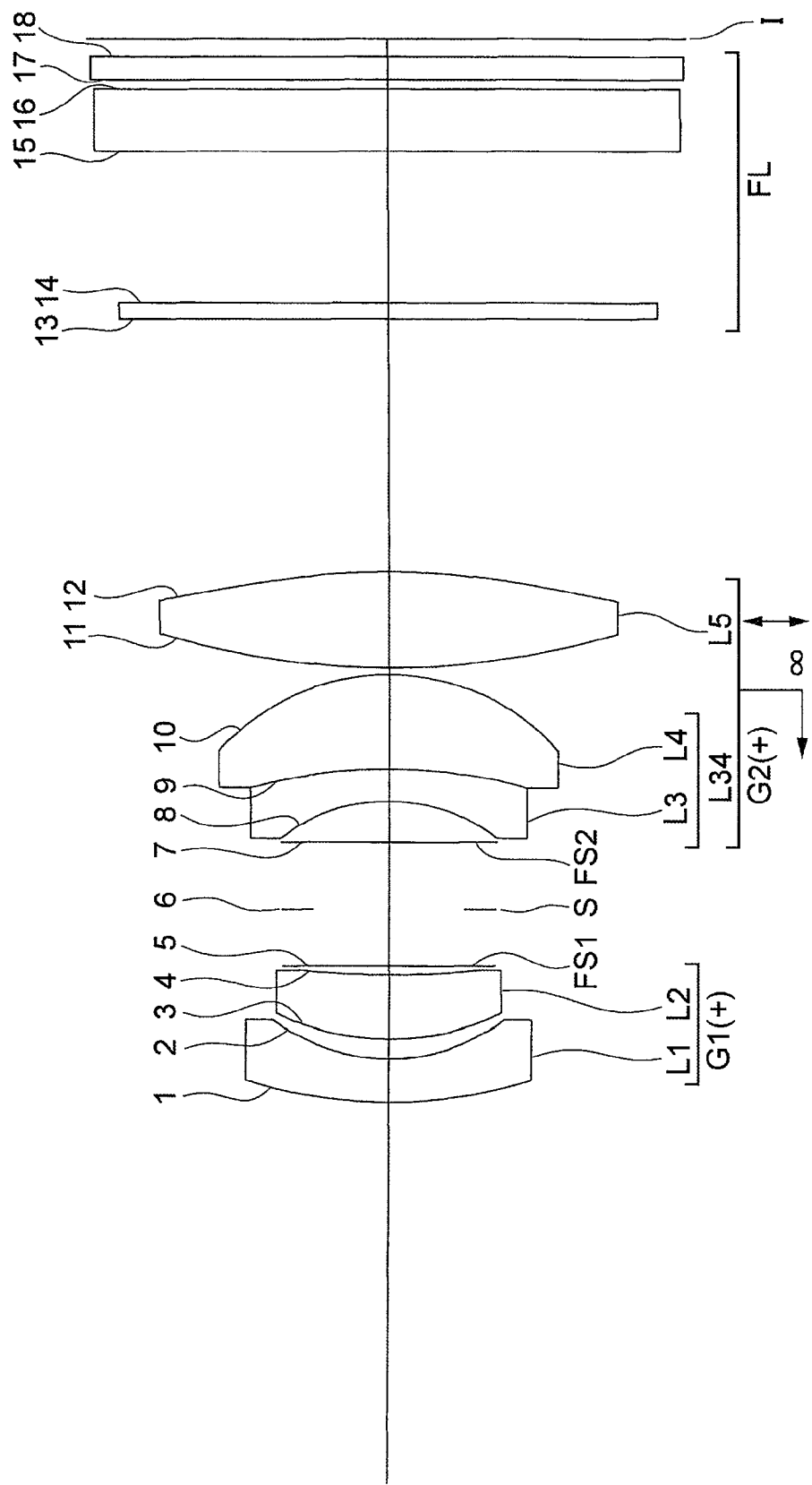
FIG. 19 is a diagram depicting a configuration of an image-capturing lens according to Example 7, and a state of movement of each lens upon changing from a state of focusing on infinity to a state of focusing on close distance.

Example 7 will be described with reference to FIG. 19 to FIG. 20 and Table 7. FIG. 19 is a diagram depicting a configuration of an image-capturing lens according to Example 7, and a moving state of each lens upon a focusing state changing from focusing on infinity to focusing on a close distance. In this example, "close distance" means a −0.010× image-capturing distance.

As FIG. 19 shows, the image-capturing lens according to Example 7 has, in order from an object, an object side lens group G1 having positive refractive power, an image side lens group G2 having positive refractive power, and a filter group FL constituted by a low pass filter, infrared cut filter, or the like. Upon a focusing state changing from focusing on infinity to focusing on close distance, that is upon focusing, the object side lens group G1 is fixed with respect to the image plane I and the image side lens group G2 moves with respect to the image plane I, and the distance between the object side lens group G1 and the image side lens group G2 (axial air space d6 in Table 7), and the distance between the image side lens group G2 and the filter group FL (axial air space d12 in Table 7) changes. The image plane I is formed on a picture element 7 in FIG. 28, and the picture element is constituted by a CCD, CMOS or the like.

The object side lens group G1 has, in order from the object, a negative meniscus lens L1 having a convex surface facing the object, and a positive meniscus lens L2 having a convex surface facing the object.

The image side lens group G2 has, in order from the object, a cemented lens L34 of a negative meniscus lens L3 having a concave surface facing the object and a positive meniscus lens L5 having a convex surface facing the image, and a biconvex positive lens L5. A hand motion blur is corrected by moving the image side lens group G2 so as to have components roughly orthogonal to the optical axis, in order to shift the image on the image plane I upon the occurrence of an image blur.

An aperture stop S is disposed between the object side lens group G1 and the image side lens group G2. The aperture stop S is fixed with respect to the object side lens group G1, upon focusing from the state of focusing on infinity to the state of focusing on close distance.

Moreover, flare stop FS1 and flare stop FS2 are disposed before and after the aperture stop S.

Table 7 shows each data of Example 7. The surface numbers 1 to 18 in Table 7 correspond to the surfaces 1 to 18 in FIG. 19.

TABLE 7

[General Data]

f = 23.65
FNO = 2.92
2ω = 62.50
Y = 14.10
TL = 53.68

[Lens Data]

| Surface Number | r | d | nd | νd |
|---|---|---|---|---|
| 1 | 23.2362 | 2.16 | 1.67790 | 54.89 |
| *2 | 8.9464 | 1.00 | | |
| 3 | 12.5597 | 3.23 | 1.88300 | 40.76 |
| 4 | 47.0545 | 0.41 | | |
| 5 | 0.0000 | 2.90 | | |
| 6 | 0.0000 | (d6) | (Aperture stop S) | |
| 7 | 0.0000 | 2.07 | | |
| 8 | −8.6712 | 1.63 | 1.80810 | 22.76 |
| 9 | −25.1262 | 4.77 | 1.75500 | 52.32 |
| 10 | −11.1163 | 0.33 | | |
| 11 | 38.1602 | 4.88 | 1.59201 | 67.02 |
| *12 | −34.3949 | (d12) | | |
| 13 | 0.0000 | 0.83 | 1.51633 | 64.14 |
| 14 | 0.0000 | 7.63 | | |
| 15 | 0.0000 | 3.10 | 1.51633 | 64.14 |
| 16 | 0.0000 | 0.50 | | |
| 17 | 0.0000 | 1.16 | 1.51633 | 64.14 |
| 18 | 0.0000 | 0.89 | | |

[Aspherical Data]

Second surface r = +8.9464, κ = +1.7327,
C4 = −2.0039-04, C6 = −3.5129E-06, C8 = +2.5209E-08,
C10 = −2.8849E-09

Twelfth surface r = −34.3949, κ = −19.0000,
C4 = −3.1738-05, C6 = +3.5586E-07, C8 = −1.6131E-09,
C10 = +3.2862E-12

[Variable Distance Upon Focusing]

| | Infinity | Close Distance |
|---|---|---|
| d6 | 3.3800 | 3.0173 |
| d12 | 12.8065 | 13.1693 |

TABLE 7-continued

[Lens Group Data]

| Group number | First surface of group | Focal length of group |
|---|---|---|
| G1 | 1 | 111.5776 |
| G2 | 8 | 23.8131 |

[Conditional Expressions]

f = 23.6481
f1 = 111.5776
f2 = 23.8131
fs = 23.8131
r1R = 8.9464
r2F = 12.5597
TL = 53.6827
Σd = 26.7682
Σd2 = 11.6106
Conditional Expression (1) Σd2/f = 0.4910
Conditional Expression (2) |f2|/|f1| = 0.2134
Conditional Expression (3) f/|fs| = 0.9931
Conditional Expression (4) (r2F + r1R)/(r2F − r1R) = 5.9520
Conditional Expression (5) TL/Σd = 2.0055

As shown in the data table in Table 7, the image-capturing lens according to this example satisfies all the conditional Expressions (1) to (5).

Figure 20A:
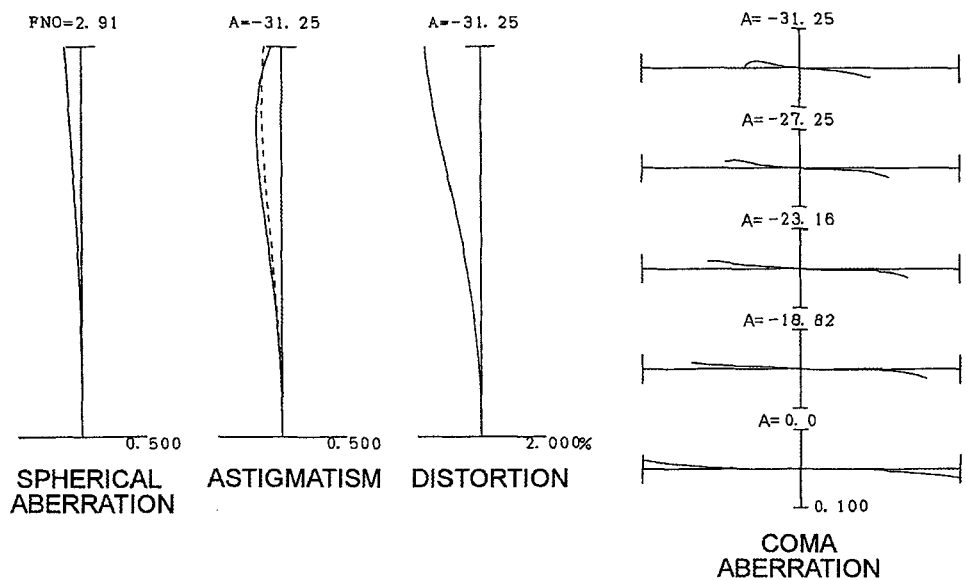
FIG. 20A are graphs showing various aberrations according to Example 7 upon focusing on infinity, and FIG. 20B are graphs showing lateral aberrations according to Example 7 in the lens shift state (0.15 mm)
Figure 20B:
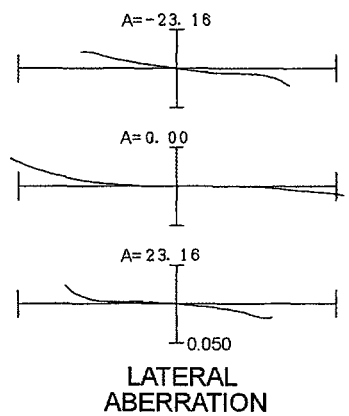
Figure 21:
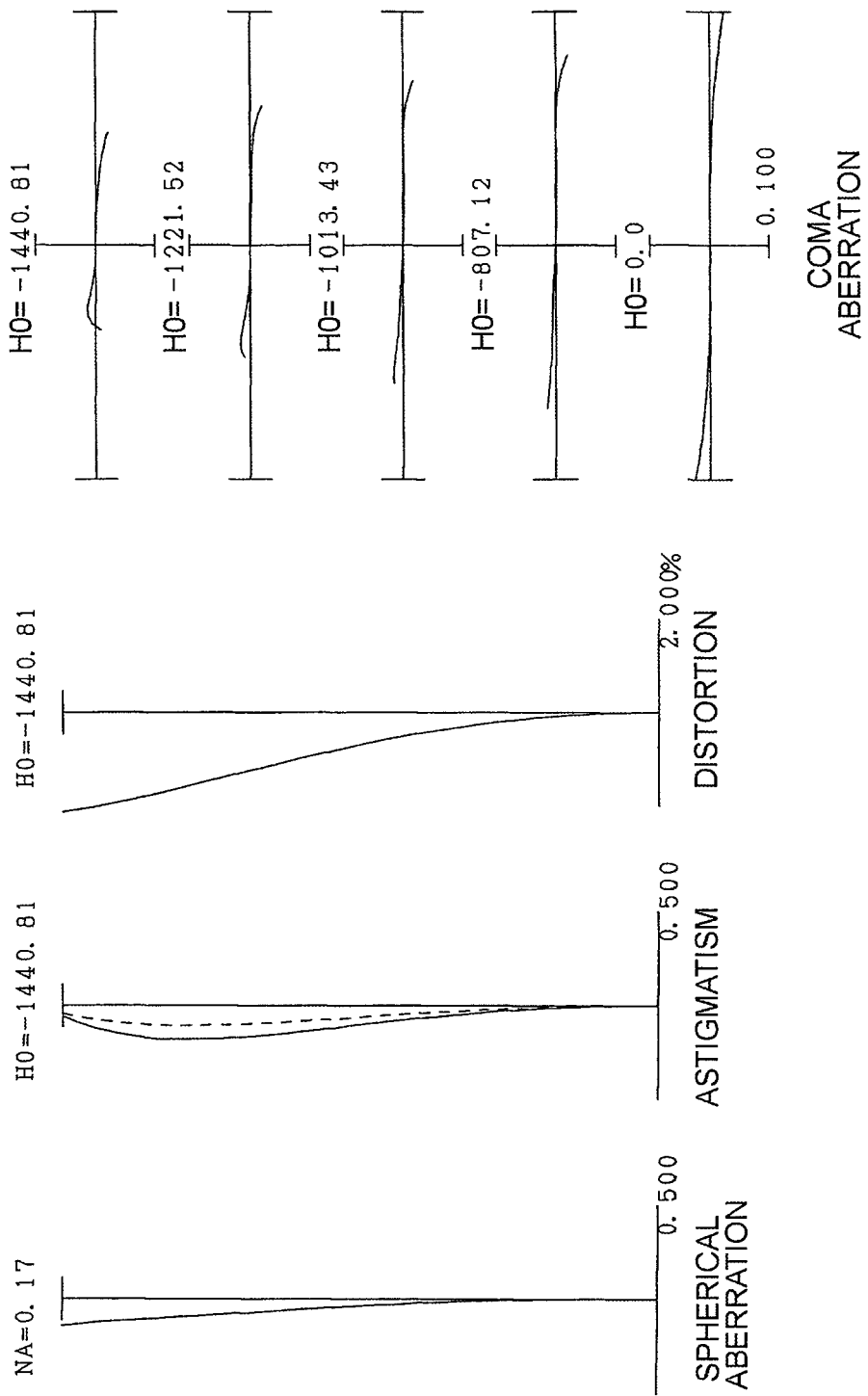
FIG. 21 are graphs showing various aberrations according to Example 7 upon focusing on close distance.

FIG. 20 are graphs showing various aberrations according to Example 7, where FIG. 20A are graphs showing various aberrations (spherical aberration, astigmatism, distortion and coma aberration in order from the left) upon focusing on infinity, and FIG. 20B are graphs showing lateral aberration when shifting lens (lens shift state) upon focusing on infinity (moving distance according to this example is 0.15 mm). FIG. 21 are graphs showing various aberrations (spherical aberration, astigmatism, distortion and coma aberration in order from the left) upon focusing on close distance in Example 7. As each graph showing aberrations clarifies, the image-capturing lens, according to Example 7, has excellent image forming performance, where various aberrations are corrected well in any state of focusing on infinity, lens shift state and state of focusing on close distance.

Example 8

Figure 22:
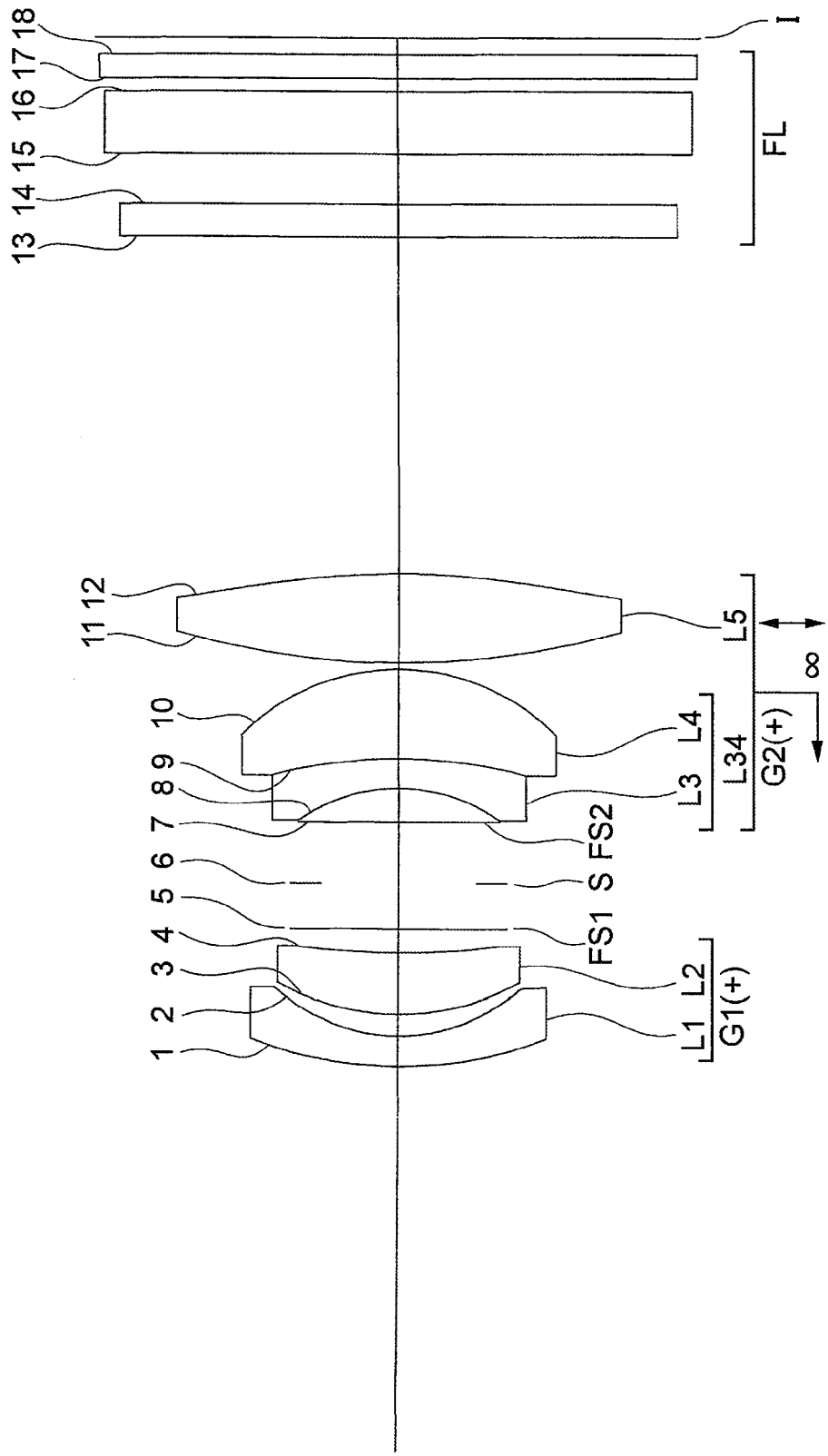
FIG. 22 is a diagram depicting a configuration of an image-capturing lens according to Example 8, and a state of movement of each lens upon changing from a state of focusing on infinity to a state of focusing on close distance.

Example 8 will be described with reference to FIG. 22 to FIG. 24 and Table 8. FIG. 22 is a diagram depicting a configuration of an image-capturing lens according to Example 8, and a moving state of each lens upon a focusing state changing from focusing on infinity to focusing on a close distance. In this example, "close distance" means a −0.015× image-capturing distance.

As FIG. 22 shows, the image-capturing lens according to Example 8 has, in order from an object, an object side lens group G1 having positive refractive power, an image side lens group G2 having positive refractive power, and a filter group FL constituted by a low pass filter, infrared cut filter, or the like. Upon a focusing state changing from focusing on infinity to focusing on close distance, that is upon focusing, the object side lens group G1 is fixed with respect to the image plane I and the image side lens group G2 moves with respect to the image plane I, and the distance between the object side lens group G1 and the image side lens group G2 (axial air space d6 in Table 8), and the distance between the image side lens group G2 and the filter group FL (axial air space d12 in Table 8) changes. The image plane I is formed on a picture element in FIG. 28, and the picture element is constituted by a CCD, CMOS or the like.

The object side lens group G1 has, in order from the object, a negative meniscus lens L1 having a convex surface facing the object and a positive meniscus lens L2 having a convex surface facing the object.

The image side lens group G2 has, in order from the object, a cemented lens L34 of a negative meniscus lens L3 having a concave surface facing the object and a positive meniscus lens L4 having a convex surface facing the image, and a biconvex positive lens L5. A hand motion blur is corrected by moving the image side lens group G2 so as to have components roughly orthogonal to the optical axis, in order to shift the image on the image plane I upon the occurrence of an image blur.

An aperture stop S is disposed between the object side lens group G1 and the image side lens group G2. The aperture stop S is fixed with respect to the object side lens group G1, upon focusing from the state of focusing on infinity to the state of focusing on close distance.

Moreover, flare stop FS1 and flare stop FS2 are disposed before and after the aperture stop S.

Table 8 shows each data of Example 8. The surface numbers 1 to 18 in Table 8 correspond to the surfaces 1 to 18 in FIG. 22.

TABLE 8

[General Data]

f = 23.65
FNO = 2.88
2ω = 62.12
Y = 14.10
TL = 51.43

[Lens Data]

| Surface Number | r | d | nd | νd |
|---|---|---|---|---|
| 1 | 19.6173 | 1.49 | 1.67790 | 54.89 |
| *2 | 8.3120 | 1.08 | | |
| 3 | 11.6554 | 3.07 | 1.88300 | 40.76 |
| 4 | 38.7445 | 1.16 | | |
| 5 | 0.0000 | 2.32 | | |
| 6 | 0.0000 | (d6) | (Aperture stop S) | |
| 7 | 0.0000 | 1.66 | | |
| 8 | −8.4037 | 1.49 | 1.80810 | 22.76 |
| 9 | −24.2702 | 4.48 | 1.75500 | 52.32 |
| 10 | −10.6126 | 0.33 | | |
| 11 | 39.0310 | 4.48 | 1.58913 | 61.16 |
| *12 | −35.5806 | (d12) | | |
| 13 | 0.0000 | 1.66 | 1.51633 | 64.14 |
| 14 | 0.0000 | 2.49 | | |
| 15 | 0.0000 | 3.10 | 1.51633 | 64.14 |
| 16 | 0.0000 | 0.66 | | |
| 17 | 0.0000 | 1.16 | 1.51633 | 64.14 |
| 18 | 0.0000 | 0.84 | | |

[Aspherical Data]

Second surface r = +8.3120, κ = +0.1277,
C4 = +1.0621E−04, C6 = +4.4647E−07, C8 = +3.3097E−09,
C10 = +2.8274E−11
Twelfth surface r = −35.5806, κ = −5.6807,
C4 = +1.4640E−05, C6 = −5.4585E−09, C8 = +6.7083E−10,
C10 = −3.8102E−12

[Variable Distance Upon Focusing]

| | Infinity | Close Distance |
|---|---|---|
| d6 | 3.0702 | 2.7011 |
| d12 | 16.8854 | 17.2545 |

TABLE 8-continued

[Lens Group Data]

| Group number | First surface of group | Focal length of group |
|---|---|---|
| G1 | 1 | 94.3582 |
| G2 | 8 | 24.4901 |

[Conditional Expressions]

f = 23.6482
f1 = 94.3582
f2 = 24.4901
fs = 24.4901
r1R = 8.3120
r2F = 11.6554
TL = 51.4350
Σd = 24.6349
Σd2 = 10.7823
Conditional Expression (1) Σd2/f = 0.4559
Conditional Expression (2) |f2|/|f1| = 0.2595
Conditional Expression (3) f/|fs| = 0.9656
Conditional Expression (4) (r2F + r1R)/(r2F − r1R) = 5.9722
Conditional Expression (5) TL/Σd = 2.0879

As shown in the data table in Table 8, the image-capturing lens according to this example satisfies all the conditional Expressions (1) to (5).

Figure 23A:
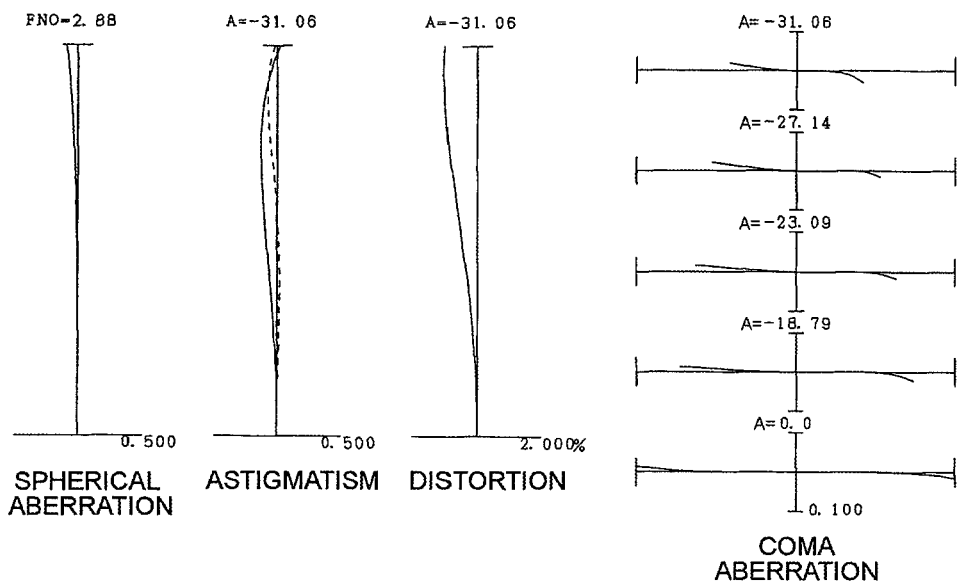
FIG. 23A are graphs showing various aberrations according to Example 8 upon focusing on infinity, and FIG. 23B are graphs showing lateral aberrations according to Example 8 in the lens shift state (0.15 mm)
Figure 23B:
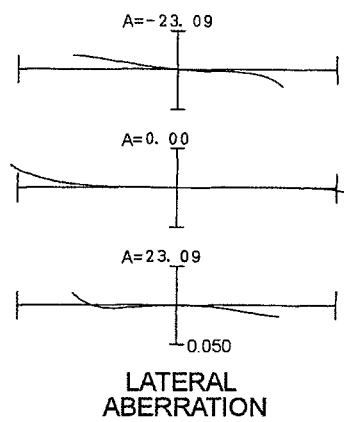
Figure 24:
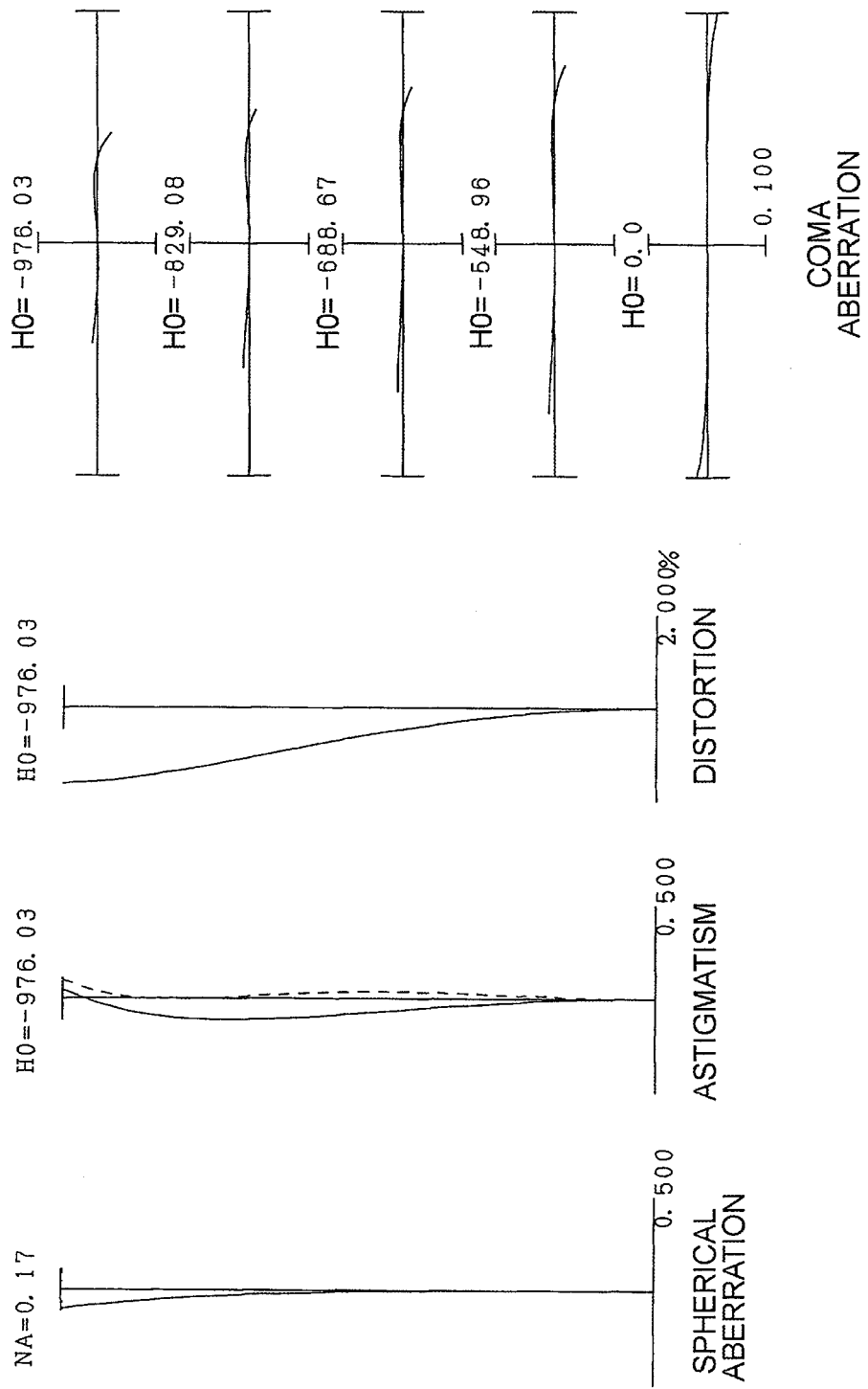
FIG. 24 are graphs showing various aberrations according to Example 8 upon focusing on close distance.

FIG. 23 are graphs showing various aberrations according to Example 8, where FIG. 23A are graphs showing various aberrations (spherical aberration, astigmatism, distortion and coma aberration in order from the left) upon focusing on infinity, and FIG. 23B are graphs showing lateral aberration when shifting lens (lens shift state) upon focusing on infinity (moving distance according to this example is 0.15 mm). FIG. 24 are graphs showing various aberrations (spherical aberration, astigmatism, distortion and coma aberration in order from the left) upon focusing on close distance in Example 8. As each graph showing aberrations clarifies, the image-capturing lens, according to Example 8, has excellent image forming performance, where various aberrations are corrected well in any state of focusing on infinity, lens shift state and state of focusing on close distance.

Example 9

Example 9 will be described with reference to FIG. 25 to FIG. 27 and Table 9. FIG. 25 is a diagram depicting a configuration of an image-capturing lens according to Example 9, and a moving state of each lens upon a focusing state changing from focusing on infinity to focusing on a close distance. In this example, "close distance" means a −0.025× image-capturing distance.

As FIG. 25 shows, the image-capturing lens according to Example 9 has, in order from an object, an object side lens group G1 having positive refractive power, an image side lens group G2 having positive refractive power, and a filter group FL constituted by a low pass filter, infrared cut filter, or the like. Upon a focusing state changing from focusing on infinity to focusing on close distance, that is upon focusing, the object side lens group G1 is fixed with respect to the image plane I and the image side lens group G2 moves with respect to the image plane I, and the distance between the object side lens group G1 and the image side lens group G2 (axial air space d7 in Table 9), and the distance between the image side lens group G2 and the filter group FL (axial air space d13 in Table 9) changes. The image plane I is formed on a picture element 7 in FIG. 28, and the picture element is constituted by a CCD, CMOS or the like.

The object side lens group G1 has, in order from the object, a negative meniscus lens L1 having a convex surface facing the object, a biconvex positive lens L2, and a negative meniscus lens L3 having a convex surface facing the object.

The image side lens group G2 has, in order from the object, a negative cemented lens L45 of a negative meniscus lens L4 having a concave surface facing the object, a positive meniscus lens L5 having a convex surface facing the image, and a biconvex positive lens L6 having an aspherical surface facing the object. A hand motion blur is corrected by moving the cemented lens L45, which is a part of the image side lens group G2, so as to have components roughly orthogonal to the optical axis, in order to shift the image on the image plane I upon the occurrence of an image blur.

An aperture stop S is disposed between the object side lens group G1 and the image side lens group G2. The aperture stop S is fixed with respect to the object side lens group G1, upon focusing from the state of focusing on infinity to the state of focusing on close distance.

Table 9 shows each data of Example 9. The surface numbers 1 to 15 in Table 9 correspond to the surfaces 1 to 15 in FIG. 25.

TABLE 9

[General Data]

f = 36.00
FNO = 1.85
2ω = 45.60
Y = 14.10
TL = 92.00

[Lens Data]

| Surface Number | r | d | nd | vd |
|---|---|---|---|---|
| 1 | 176.0137 | 1.40 | 1.58913 | 61.18 |
| 2 | 27.3013 | 9.07 | | |
| 3 | 33.2143 | 4.94 | 1.77250 | 49.61 |
| 4 | −347.2568 | 0.10 | | |
| 5 | 18.6027 | 4.45 | 1.84666 | 23.78 |
| 6 | 14.2382 | 6.90 | | |
| 7 | 0.0000 | (d7) | (Aperture stop S) | |
| 8 | −14.5276 | 1.10 | 1.84666 | 23.78 |
| 9 | −77.2310 | 5.59 | 1.77250 | 49.61 |
| 10 | −18.6999 | 1.67 | | |
| *11 | 172.8130 | 0.10 | 1.55389 | 38.09 |
| 12 | 172.8130 | 5.65 | 1.80400 | 46.58 |
| 13 | −34.0594 | (d13) | | |
| 14 | 0.0000 | 1.50 | 1.51633 | 64.14 |
| 15 | 0.0000 | 0.50 | | |

[Aspherical Data]
Eleventh surface r = +172.8130, κ = +1.0000,
C4 = −7.1412-06, C6 = +2.6456E-09, C8 = +4.0280E-12,
C10 = +0.0000E-00

[Variable Distance Upon Focusing]

| | Infinity | Close Distance |
|---|---|---|
| d7 | 11.9969 | 11.0759 |
| d13 | 37.0217 | 37.9427 |

[Lens Group Data]

| Group number | First surface of group | Focal length of group |
|---|---|---|
| G1 | 1 | 218.5857 |
| G2 | 8 | 36.0921 |

TABLE 9-continued

[Conditional Expressions]

f = 35.9951
f1 = 218.5857
f2 = 36.0921
fs = −141.282
r1R = 27.3014
r2F = 33.2143
TL = 91.9897
Σd = 52.6810
Σd2 = 14.1100
Conditional Expression (1) Σd2/f = 0.3920
Conditional Expression (2) |f2|/|f1| = 0.1651
Conditional Expression (3) f/|fs| = 0.2548
Conditional Expression (4) (r2F + r1R)/(r2F − r1R) = 10.2344
Conditional Expression (5) TL/Σd = 1.7462

As shown in the data table in Table 9, the image-capturing lens according to this example satisfies all the conditional Expressions (1) to (5).

Figure 26A:
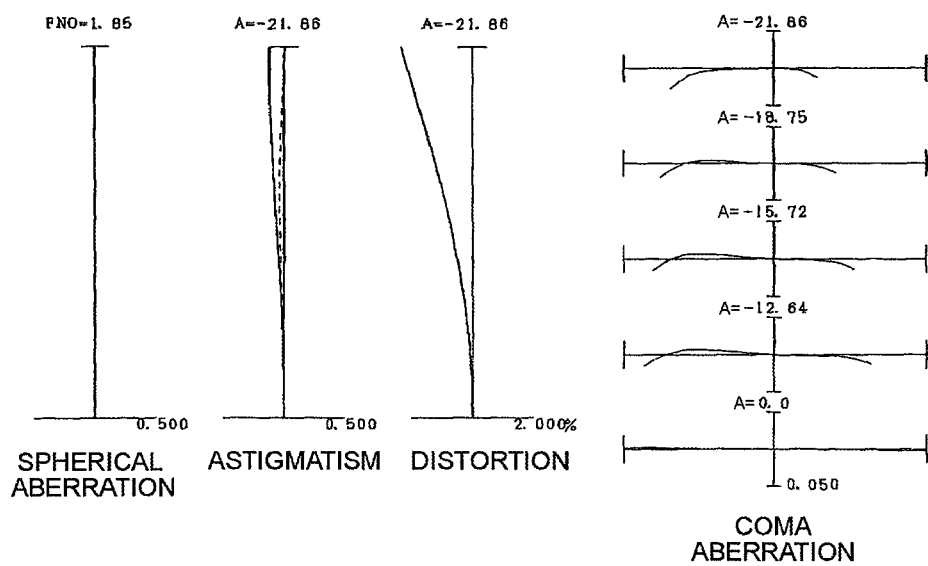
FIG. 26A are graphs showing various aberrations according to Example 9 upon focusing on infinity, and FIG. 26B are graphs showing lateral aberrations according to Example 9 in the lens shift state (0.15 mm)
Figure 26B:
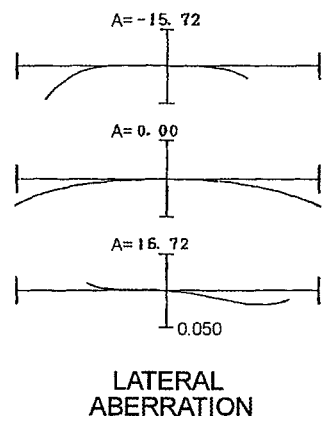
Figure 27:
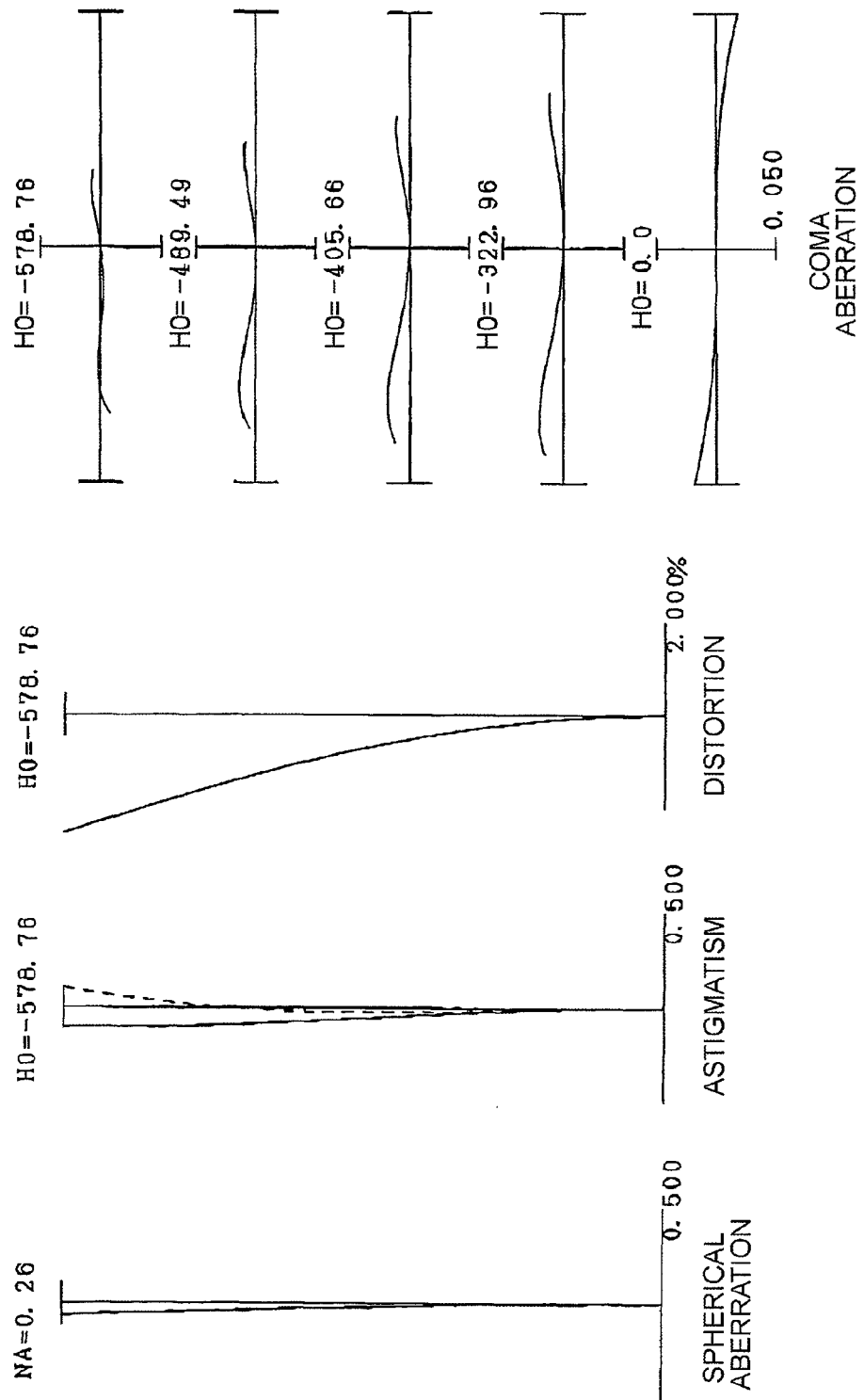
FIG. 27 are graphs showing various aberrations according to Example 9 upon focusing on close distance.

FIG. 26 are graphs showing various aberrations according to Example 9, where FIG. 26A are graphs showing various aberrations (spherical aberration, astigmatism, distortion and coma aberration in order from the left) upon focusing on infinity, and FIG. 26B are graphs showing lateral aberration when shifting lens (lens shift state) upon focusing on infinity (moving distance according to this example is 0.15 mm). FIG. 27 are graphs showing various aberrations (spherical aberration, astigmatism, distortion and coma aberration in order from the left) in Example 9 upon focusing on close distance. As each graph showing aberrations clarifies, the image-capturing lens, according to Example 9, has excellent image forming performance, where various aberrations are corrected well in any state of focusing on infinity, lens shift state and state of focusing on close distance.

In the above embodiment, the following content can be adopted within a range where the optical performance is not diminished.

In the above examples, the image-capturing lens comprised of five to seven lenses was shown, but it can also be applied to a configuration where a lens is added to the side closest to the object, or a configuration where a lens is added to the side closest to the image.

In the present embodiment, a single or a plurality of lens group(s) or a partial lens group may be designed to be a focusing lens group, which performs focusing from an object at infinity to an object at close distance by moving in the optical axis direction. This focusing lens group can be applied to auto focus, and is also suitable for driving a motor for auto focusing (e.g. driving using an ultrasonic motor). It is particularly preferable that the image side lens group is designed to be the focusing lens group.

In the present embodiment, a lens group or a partial lens group may be designed to perform lens group image stabilization, which corrects image blurs generated by hand motion, by moving the lens group or a partial lens group so as to have components orthogonal to the optical axis direction, or rotating (vibrating) the lens group or partial lens group in the in-plane direction, including the optical axis. It is particularly preferable that at least a part of the image side lens group is designed to perform lens group image stabilization.

In the present embodiment, the lens surface may be formed to be a spherical surface or plane, or an aspherical surface. If the lens surface is a spherical surface or plane, then lens processing, assembly and adjustment are easy, and deterioration of optical performance, due to an error in processing, assembly and adjustment can be prevented. Even if the image plane is shifted, the drawing performance is not affected very much, which is desirable. If the lens surface is an aspherical surface, the aspherical surface can be any one of an aspherical surface generated by grinding, a glass molded aspherical surface generated by forming glass in an aspherical shape using a die, and a composite aspherical surface generated by forming resin on the surface of the glass to be an aspherical shape. The lens surface may be a diffraction surface, and the lens may be a refractive index distributed lens (GRIN lens) or plastic lens.

It is desirable that the aperture stop S is disposed between the objective side lens group G1 and the image side lens group G2, but the role of the aperture stop may be substituted by the lens frame, without disposing a separate element as the aperture stop.

In the present embodiment, it is preferable that the flare cut stops FS1 and FS2 are disposed near the aperture stop S, but the role of the flare cut stop may be substituted by the lens frame, without disposing a separate element as the flare cut stop.

Each lens surface may be coated with an anti-reflection film which has high transmittance in a wide wavelength region, in order to decrease flares and ghosts, and implement a high optical performance with high contrast.

In the present embodiment, it is preferable that the Object side lens group G1 has one positive lens component and one negative lens component. It is preferable that the lens components are disposed in the sequence of negative, positive and negative, or negative, positive and positive, with an air space respectively, in order from the object.

In the present embodiment, it is preferable that the image side lens group G2 has two positive lens components and one negative lens component. It is preferable that the lens components are disposed in the sequence of negative, positive and positive, or negative, positive and positive, with an air space respectively, in order from the object. In the image side lens group G2, it is preferable that a cemented lens is disposed to an image side of the aperture stop S.

In the present embodiment, a positive or a negative lens L0 may be added to an object side of a lens closest to the object in the object side lens group G1. In this case, the total length TL of the image-capturing lens is a distance from the object side lens surface of the lens L0 disposed closest to the object.

The embodiments were described with the configuration requirements to clarify the present invention, but needless to say, the present invention is not limited to these embodiments.
Explanation of Numerals and Characters
1 digital single lens reflex camera (optical apparatus)
2 image-capturing lens
G1 object side lens group
G2 Image side lens group
S aperture stop
I image plan

What is claimed is:

1. An image-capturing lens comprising, in order from an object, an object side lens group having at least two lenses, and an image side lens group which is disposed next to the object side lens group with an air space, an aperture stop being disposed between the object side lens group and the image side lens group, focusing being performed from a distant object to a close object by moving the image side lens group along an optical axis as a focusing lens group, image stabilization being performed by moving at least a part of the image side lens group, as a shift lens group, so as to have a motion component substantially orthogonal to the optical axis, the object side lens group and the image side lens group having positive refractive power, and the following conditional expression being satisfied:

$$9.7902 \leq (r2F + r1R)/(r2F - r1R) < 24.8$$

where r1R denotes a radius of curvature of an image side surface of a lens closest to the object in the object side lens group, and r2F denotes a radius of curvature of an object side surface of a lens disposed at the image side of the lens closest to the object in the object side lens group, and wherein the following conditional expression is satisfied:

$$0.27<\Sigma d2/f<0.60$$

where f denotes a focal length of the image-capturing lens, and Σd2 denotes a length on the optical axis from a lens surface closest to the object to a lens surface closest to the image in the image side lens group.

2. The image-capturing lens according to claim 1, wherein at least a part of the focusing lens group is the shift lens group.

3. The image-capturing lens according to claim 1, wherein the following conditional expression is satisfied:

$$0.06<|f2|/|f1|<0.49$$

where f1 denotes a focal length of the object side lens group, and f2 denotes a focal length of the image side lens group.

4. The image-capturing lens according to claim 1, wherein the following conditional expression is satisfied:

$$0.80<f/|fs|<1.10$$

where f denotes a focal length of the image-capturing lens, and fs denotes a focal length of the shift lens group.

5. The image-capturing lens according to claim 1, wherein the following conditional expression is satisfied:

$$1.5<TL/\Sigma d<2.3$$

where TL denotes a total length of the image-capturing lens, and Σd denotes a length, on the optical axis, from a lens surface closest to the object in the object side lens group to a lens surface closest to the image in the image side lens group.

6. The image-capturing lens according to claim 1, wherein the focusing lens group is the shift lens group.

7. The image-capturing lens according to claim 1, wherein the focal length of the image-capturing lens is fixed.

8. The image-capturing lens according to claim 1, wherein the image side lens group has a positive lens component, and the positive lens component includes at least one aspherical surface.

9. The image-capturing lens according to claim 1, wherein the image side lens group has a negative lens component disposed closest to the object, and a positive lens component disposed at the image side of the negative lens component.

10. The image-capturing lens according to claim 1, wherein the image side lens group has a cemented lens which has a negative lens component and a positive lens component, and has a positive or negative refractive power.

11. The image-capturing lens according to claim 1, wherein the image side lens group has a cemented lens of a negative meniscus lens having a concave surface facing the object, and a positive meniscus lens having a convex surface facing the image.

12. An optical apparatus having an image-capturing lens for forming an image of an object on a predetermined image plane,
the image-capturing lens being the image-capturing lens according to claim 1.

13. A method for manufacturing an image-capturing lens, the method comprising:
disposing, in order from an object, an object side lens group which has positive refractive power and which has at least two lenses, and an image side lens group which is disposed next to the object side lens group with an air space and which has positive refractive power, with an aperture stop being disposed between the object side lens group and the image side lens group;

the image side lens group being movable in the optical axis direction, as a focusing lens group, upon focusing from a distant object to a close object;

at least a part of the image side lens group being movable, as a shift lens group, so as to have a motion component substantially orthogonal to the optical axis upon stabilizing an image; and satisfying the following conditional expression:

$$9.7902 \leq (r2F+r1R)/(r2F-r1R)<24.8$$

where r1R denotes a radius of curvature of an image side surface of a lens closest to the object in the object side lens group, and r2F denotes a radius of curvature of an object side surface of a lens disposed at the image side of the lens closest to the object in the object side lens group, and wherein the following conditional expression is satisfied:

$$0.27<\Sigma d2/f<0.60$$

where f denotes a focal length of the image-capturing lens, and Σd2 denotes a length on the optical axis from a lens surface closest to the object to a lens surface closest to the image in the image side lens group.

14. The method for manufacturing an image-capturing lens according to claim 13, wherein the following conditional expression is satisfied:

$$1.5<TL/\Sigma d<2.3$$

where TL denotes a total length of the image-capturing lens, and Σd denotes a length, on the optical axis, from a lens surface closest to the object in the object side lens group to a lens surface closest to the image in the image side lens group.

15. An image-capturing lens comprising, in order from an object, an object side lens group having at least two lenses, and an image side lens group which is disposed next to the object side lens group with an air space, the image side lens group having a negative lens component disposed closest to the object, and a positive lens component disposed at the image side of the negative lens component, an aperture stop being disposed between the object side lens group and the image side lens group, focusing being performed from a distant object to a close object by moving the image side lens group along an optical axis as a focusing lens group, image stabilization being performed by moving at least a part of the image side lens group, as a shift lens group, so as to have a motion component substantially orthogonal to the optical axis, the object side lens group and the image side lens group having positive refractive power, and the following conditional expression being satisfied:

$$9.7902 \leq (r2F+r1R)/(r2F-r1R)<24.8$$

where r1R denotes a radius of curvature of an image side surface of a lens closest to the object in the object side lens group, and r2F denotes a radius of curvature of an object side surface of a lens disposed at the image side of the lens closest to the object in the object side lens group.

* * * * *